United States Patent
Satoh

(10) Patent No.: US 9,639,913 B2
(45) Date of Patent: May 2, 2017

(54) IMAGE PROCESSING DEVICE, IMAGE PROCESSING METHOD, IMAGE PROCESSING PROGRAM, AND STORAGE MEDIUM

(71) Applicant: Morpho, Inc., Chiyoda-ku, Tokyo (JP)

(72) Inventor: Masaki Satoh, Chiyoda-ku (JP)

(73) Assignee: Morpho, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/397,579

(22) PCT Filed: Nov. 1, 2013

(86) PCT No.: PCT/JP2013/079724
§ 371 (c)(1),
(2) Date: Oct. 28, 2014

(87) PCT Pub. No.: WO2014/069632
PCT Pub. Date: May 8, 2014

(65) Prior Publication Data
US 2015/0123990 A1  May 7, 2015

(30) Foreign Application Priority Data
Nov. 5, 2012 (WO) .................. PCT/JP2012/078591

(51) Int. Cl.
*H04N 5/232* (2006.01)
*G06T 3/00* (2006.01)
(Continued)

(52) U.S. Cl.
CPC .............. *G06T 3/0056* (2013.01); *G06T 3/40* (2013.01); *G06T 5/009* (2013.01); *H04N 5/2329* (2013.01);
(Continued)

(58) Field of Classification Search
None
See application file for complete search history.

(56) References Cited

U.S. PATENT DOCUMENTS 5,696,848 A * 12/1997 Patti ...................... G06T 3/4053
348/E5.062
2005/0179784 A1 * 8/2005 Qi .......................... H04N 5/145
348/208.1
(Continued)

FOREIGN PATENT DOCUMENTS

CN 101815163 A 8/2010
CN 101815166 A 8/2010
(Continued)

OTHER PUBLICATIONS

Office Action dated Aug. 17, 2015, issued by the Korean Intellectual Property Office in counterpart Korean Patent Application No. 10-2014-7028881.
(Continued)

*Primary Examiner* — Xiao Wu
*Assistant Examiner* — Steven Elbinger
(74) *Attorney, Agent, or Firm* — Sughrue Mion, PLLC

(57) ABSTRACT

A device comprises an input unit, a motion acquisition unit, a matrix operation unit, and a drawing unit. The input unit implements sequential input of a first frame image and a second frame image. The motion acquisition unit acquires motion data between the first frame image and the second frame image. The matrix operation unit calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in
(Continued)

the first matrix and the second matrix. The drawing unit generates the output frame image from the second frame image by using the projection matrix.

14 Claims, 13 Drawing Sheets

(51) Int. Cl.
*G06T 3/40* (2006.01)
*G06T 5/00* (2006.01)

(52) U.S. Cl.
CPC ..... *H04N 5/23248* (2013.01); *H04N 5/23254* (2013.01); *H04N 5/23267* (2013.01)

(56) References Cited

U.S. PATENT DOCUMENTS

| | | | |
|---|---|---|---|
| 2007/0222864 A1 | 9/2007 | Hiraga et al. | |
| 2009/0160957 A1* | 6/2009 | Deng | G06T 7/2026 348/208.99 |
| 2009/0296824 A1* | 12/2009 | Seo | H04N 5/23248 375/240.24 |
| 2011/0085049 A1* | 4/2011 | Dolgin | H04N 5/23248 348/208.4 |
| 2011/0176014 A1* | 7/2011 | Hong | H04N 5/145 348/208.4 |
| 2013/0265460 A1* | 10/2013 | Wu | G06T 5/006 348/222.1 |

FOREIGN PATENT DOCUMENTS

| | | |
|---|---|---|
| CN | 101902573 A | 12/2010 |
| CN | 102017605 A | 4/2011 |
| CN | 102694979 A | 9/2012 |
| EP | 2533517 A1 | 12/2012 |
| JP | 2002-236924 A | 8/2002 |
| JP | 2007-226643 A | 9/2007 |
| JP | 2010-118962 A | 5/2010 |
| JP | 2010-193302 A | 9/2010 |
| JP | 2011114407 A | 6/2011 |
| KR | 10-2005-0061115 A | 6/2005 |
| KR | 10-2011-0126546 A | 11/2011 |

OTHER PUBLICATIONS

International Preliminary Report on Patentability dated May 14, 2015 from the International Bureau in Counterpart International Application No. PCT/JP2013/079724.
International Preliminary Report on Patentability dated May 14, 2015 from the International Bureau in Counterpart International Application No. PCT/JP2012/078591.
International Search Report of counterpart application PCT/JP2012/078591 dated Dec. 11, 2012.
International Search Report of PCT/JP2013/079724 dated Dec. 10, 2013.
Communication dated Jun. 17, 2015, issued by the European Patent Office in corresponding European Application No. 13850725.6.
Communication dated Mar. 18, 2016 from Korean Intellectual Property Office in counterpart Application No. 10-2014-7028881.
Communication dated Dec. 15, 2016 from the State Intellectual Property Office of the P.R.C. in counterpart Application No. 201380020123.5.

* cited by examiner

FIG. 3
(A)
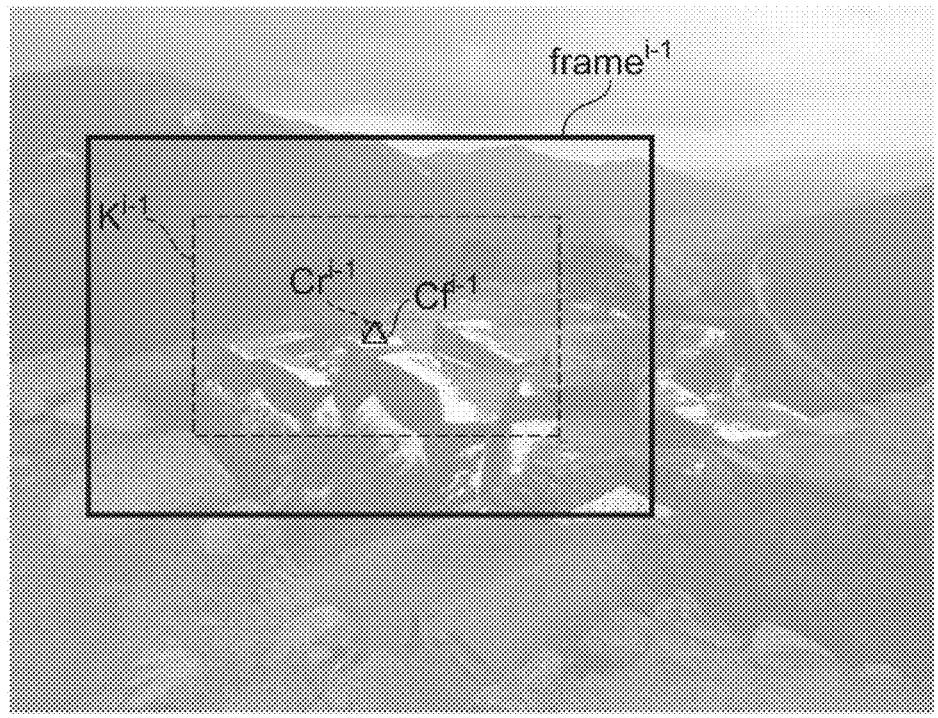
(B)
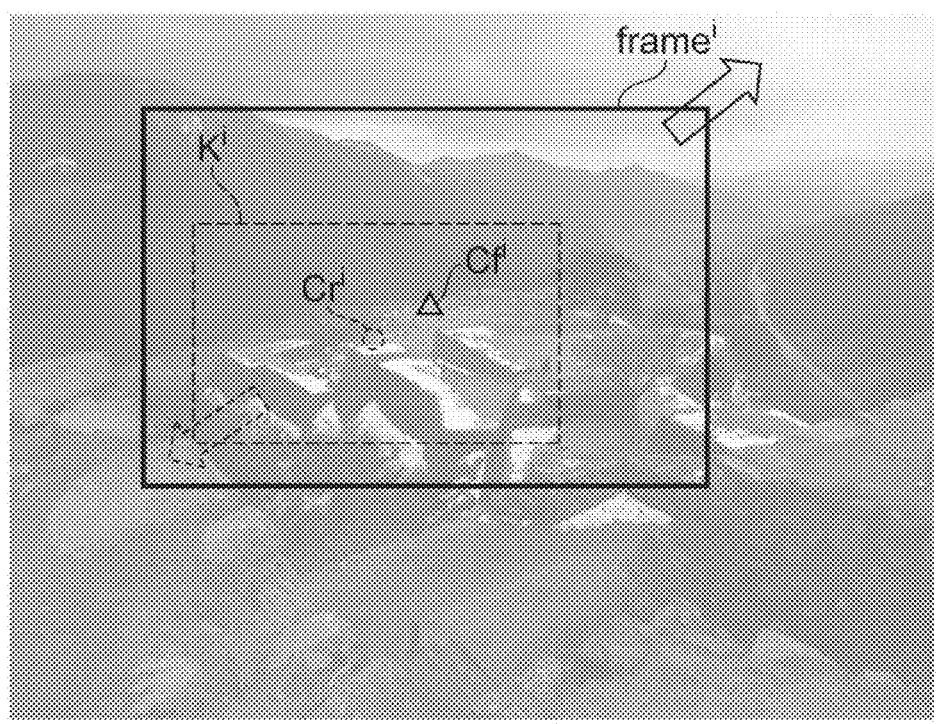

IMAGE PROCESSING DEVICE, IMAGE PROCESSING METHOD, IMAGE PROCESSING PROGRAM, AND STORAGE MEDIUM

CROSS REFERENCE TO RELATED APPLICATIONS

This is a National Stage of International Application No. PCT/JP2013/079724 filed Nov. 1, 2013, claiming priority based on International Patent Application No. PCT/JP2012/078591 filed Nov. 5, 2012, the contents of all of which are incorporated herein by reference in their entirety.

TECHNICAL FIELD

The present invention relates to an image processing device, an image processing method, an image processing program, and a storage medium.

BACKGROUND ART

As a conventional image processing device, there is a known device which determines an appropriate clipping region to be clipped from a shot frame image, in order to eliminate influence of camera shake or the like during an image-shooting operation of a video (e.g., cf. Patent Literature 1). The image processing device described in Patent Literature 1 is configured to detect motion data indicative of how much a frame image deviates from a reference frame image (e.g., a preceding input frame image) and to move or deform the clipping region according to the detected motion data, thereby to make a correction to keep the clipping region stationary relative to motion of a camera. This image processing device calculates a movement amount or a deformation amount in view of motion according to four degrees of freedom comprising rotation, enlargement/reduction and parallel translation, or in view of motion according to six degrees of freedom comprising parallel translation, rotation, enlargement/reduction and shear, and adjusts the clipping region, based thereon.

For the image processing device, there is a known technique of accurately calculating a rolling shutter distortion component and a camera motion component (e.g., cf. Patent Literature 2). The image processing device described in Patent Literature 2 is configured to model a global motion vector expressed in the form of an affine transformation matrix, by substituting the vector into a component separation expression which separately expresses the rolling shutter distortion component and the camera motion component with use of unknown component parameters. Then, the device solves equations obtained from the modelled component separation expression to obtain each of the component parameters and individually and accurately calculate the rolling shutter distortion component and the camera motion component.

CITATION LIST

Patent Literature

Patent Literature 1: Japanese Patent Application Laid-open Publication No. 2007-226643
Patent Literature 2: Japanese Patent Application Laid-open Publication No, 2010-193302

SUMMARY OF INVENTION

Technical Problem

In the case where a region is clipped from a frame image as in the image processing device described in Patent Literature 1, it is necessary to more accurately calculate the motion of the camera (camera motion component), based on motion data between frame images, in order to obtain a more suitable region as the region to be clipped. It is conceivable herein to use the image processing device described in Patent Literature 2 to model the whole motion of the camera, thereby to accurately calculate the camera motion component. Then, it is conceivable to consider the motion, for example, according to six degrees of freedom as degrees of freedom for deformation of the image, as in the image processing device described in Patent Literature 2. This allows us to obtain accurate motion data closer to the actual camera motion than in the case where the motion is considered according to four degrees of freedom. However, if correction were made for only a defect due to camera motion not intended by a user, design of a correction filter for correction of the camera shake or the like could become more complicated with increase in degrees of freedom. For example, when the imaging device (camera) is panned or tilted, it is necessary to change a level of correction for each degree of freedom and eliminate influence of the camera shake and the like, while letting the clipping region follow the panning or tilting motion.

Furthermore, Patent Literature 2 discloses only the component separation expression in the case where the motion vector is limited to the affine transformation according to six degrees of freedom; for this reason, when the motion vector is expressed by perspective projection, it is necessary to model the vector by a component separation expression different from the affine transformation. Since the image processing device described in Patent Literature 2 needs to prepare the component separation expressions depending upon formats of motion data as described above, application thereof might be limited. Furthermore, if in the image processing device described in Patent Literature 2 an inaccurate global motion vector is substituted into the component separation expression, it will naturally result in deriving the rolling shutter distortion component and the camera motion component being inaccurate, and thus the device can fail to perform robust processing.

In the present technical field, there are demands for an image processing device, image processing method, image processing program, and storage medium which readily and suitably determine a region to be clipped from a frame image and which facilitate design of a correction filter for correction of the camera shake and the like.

Solution to Problem

Specifically, an image processing device according to one aspect of the present invention is an image processing device which sets in a frame image generated by an imaging device, a region of a size smaller than the frame image, and which corrects a position or a shape of the region according to motion of the imaging device to generate an output frame image. The device comprises an input unit, a motion acquisition unit, a matrix operation unit, and a drawing unit. The input unit implements sequential input of a first frame image and a second frame image. The motion acquisition unit acquires motion data between the first frame image and the second frame image. The matrix operation unit calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix. The drawing unit generates the output frame image from the second frame image by using the projection matrix. The matrix operation unit comprises a first calculation unit, a second calculation unit, and an auxiliary matrix calculation unit. The first calculation unit calculates the first matrix for the projection matrix by using the motion data. The second calculation unit calculates the second matrix for the projection matrix by using the motion data, the first matrix, and, the second matrix in the past. The auxiliary matrix calculation unit calculates the auxiliary matrix for the projection matrix by using the motion data, the first matrix, and, the auxiliary matrix in the past.

In this image processing device, the motion of deformation of the image is handled by dividing it into at least either the parallel translation component or the rotation component, the rolling shutter distortion component, and the other component, and they are individually calculated. The first calculation unit calculates with some degree of accuracy the first matrix including the rolling shutter distortion component by using the motion data. The second calculation unit calculates the second matrix including at least one of the parallel translation component and the rotation component by using the motion data, the first matrix, and, the second matrix in the past. The auxiliary matrix calculation unit calculates the auxiliary matrix including the motion component not included in the first matrix and the second matrix by using the motion data, the first matrix, and, the auxiliary matrix in the past. In this manner, the image processing device can decompose the motion data into three parts and individually calculate them in the calculation procedure, thus enabling the processing according to the motion component. For example, the rolling shutter distortion component can be excluded from the correction target to be subjected to removal of the camera shake and the like. This can facilitate design of computation cost for correction and correction filters. Furthermore, since the parallel translation component or the rotation component, and the component included in the auxiliary matrix are calculated by their respective formulas, it becomes feasible to independently correct the parallel translation component or the rotation component strongly reflecting human intention, and the other rest component without relation to each other. Namely, the motion component strongly reflecting the human intention and the other motion component can be corrected by different filters, and thus it becomes feasible to simultaneously achieve elimination of the defect due to the motion not intended by the user and appropriate follow-up to a camera work. Since the corrections for the respective components are independent, the correction filters can be readily designed. Even if the format of motion data is changed or there is inaccurate data, the auxiliary matrix can be made to include a changed portion in the format of motion data or an error portion, and thus the device is compatible with all formats of motion data. Furthermore, since there is no restriction on a calculation method of motion by the second calculation unit, it is possible, for example, to apply a calculation method that is not accurate but robust, to the calculation method of motion by the second calculation unit.

In this case, robust processing can be performed as a whole of the image processing device.

In one embodiment, the first calculation unit may calculate the first matrix for the projection matrix, based on the parallel translation component included in the motion data. When the rolling shutter distortion component is assumed to be attributed to only the parallel translation component as in this case, the rolling shutter distortion component can be readily and quickly estimated as a relatively accurate component.

In one embodiment, the auxiliary matrix may include a component to convert a quadrilateral to a trapezoid. When deformation of the image is considered as one according to eight degrees of freedom as in this case, the auxiliary matrix is made to include the component to convert a quadrilateral to a trapezoid, whereby the defect due to the motion not intended by the user can be more naturally eliminated without affecting the processing to follow the motion intended by the user.

In one embodiment, the auxiliary matrix may include an enlargement/reduction component. For example, when the enlargement/reduction component is less likely to be used in image-shooting scenes, the auxiliary matrix is made to include the enlargement/reduction component, whereby the defect due to the motion not intended by the user can be more naturally eliminated without affecting the processing to follow the motion intended by the user.

In one embodiment, the second matrix may include an enlargement/reduction component. For example, when the enlargement/reduction component is more likely to be used in image-shooting scenes, the second matrix is made to include the enlargement/reduction component, whereby the processing to follow the motion intended by the user can be more accurately carried out.

In one embodiment, the motion acquisition unit may acquire an output value from a gyro sensor. When the device is configured to operate in collaboration with hardware as in this case, it can also perform suitable image processing.

An image processing method according to another aspect of the present invention is an image processing method which sets in a frame image generated by an imaging device, a region of a size smaller than the frame image, and which corrects a position or a shape of the region according to motion of the imaging device to generate an output frame image. The method comprises an input step, a motion acquisition step, a matrix operation step, and a drawing step. The input step is to implement sequential input of a first frame image and a second frame image. The motion acquisition step is to acquire motion data between the first frame image and the second frame image. The matrix operation step is to calculate a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix. The drawing step is to generate the output frame image from the second frame image by using the projection matrix. The matrix operation step has a first calculation step, a second calculation step, and an auxiliary matrix calculation step. The first calculation step is to calculate the first matrix for the projection matrix by using the motion data. The second calculation step is to calculate the second matrix for the projection matrix by using the motion data, the first matrix, and, the second matrix in the past. The auxiliary matrix calculation step is to calculate the auxiliary matrix for the projection matrix by using the motion data, the first matrix, and, the auxiliary matrix in the past.

An image processing program according to another aspect of the present invention is an image processing program which lets a computer function to set in a frame image generated by an imaging device, a region of a size smaller than the frame image, and to correct a position or a shape of the region according to motion of the imaging device to generate an output frame image. The program lets the computer function as an input unit, a motion acquisition unit, a matrix operation unit, and a drawing unit. The input unit implements sequential input of a first frame image and a second frame image. The motion acquisition unit acquires motion data between the first frame image and the second frame image. The matrix operation unit calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix. The drawing unit generates the output frame image from the second frame image by using the projection matrix. The matrix operation unit comprises a first calculation unit, a second calculation unit, and an auxiliary matrix calculation unit. The first calculation unit calculates the first matrix for the projection matrix by using the motion data. The second calculation unit calculates the second matrix for the projection matrix by using the motion data, the first matrix, and, the second matrix in the past. The auxiliary matrix calculation unit calculates the auxiliary matrix for the projection matrix by using the motion data, the first matrix, and, the auxiliary matrix in the past.

A storage medium according to another aspect of the present invention is a computer-readable storage medium storing an image processing program. The image processing program lets a computer function to set in a frame image generated by an imaging device, a region of a size smaller than the frame image, and to correct a position or a shape of the region according to motion of the imaging device to generate an output frame image. The program lets the computer function as an input unit, a motion acquisition unit, a matrix operation unit, and a drawing unit. The input unit implements sequential input of a first frame image and a second frame image. The motion acquisition unit acquires motion data between the first frame image and the second frame image. The matrix operation unit calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix. The drawing unit generates the output frame image from the second frame image by using the projection matrix. The matrix operation unit comprises a first calculation unit, a second calculation unit, and an auxiliary matrix calculation unit. The first calculation unit calculates the first matrix for the projection matrix by using the motion data. The second calculation unit calculates the second matrix for the projection matrix by using the motion data, the first matrix, and, the second matrix in the past. The auxiliary matrix calculation unit calculates the auxiliary matrix for the projection matrix by using the motion data, the first matrix, and, the auxiliary matrix in the past.

The image processing method, image processing program, and storage medium described above achieve the same effects as the image processing device according to one aspect of the present invention described above.

Advantageous Effects of Invention

The various aspects and embodiments of the present invention provide the image processing device, image processing method, image processing program, and storage medium which readily and suitably determine the region to be clipped from the frame image and which facilitate design of the correction filter for correction of the camera shake and the like.

BRIEF DESCRIPTION OF DRAWINGS

FIG. 3 is a schematic drawing for explaining a principle of camera shake correction.

DESCRIPTION OF EMBODIMENTS

Figure 1:
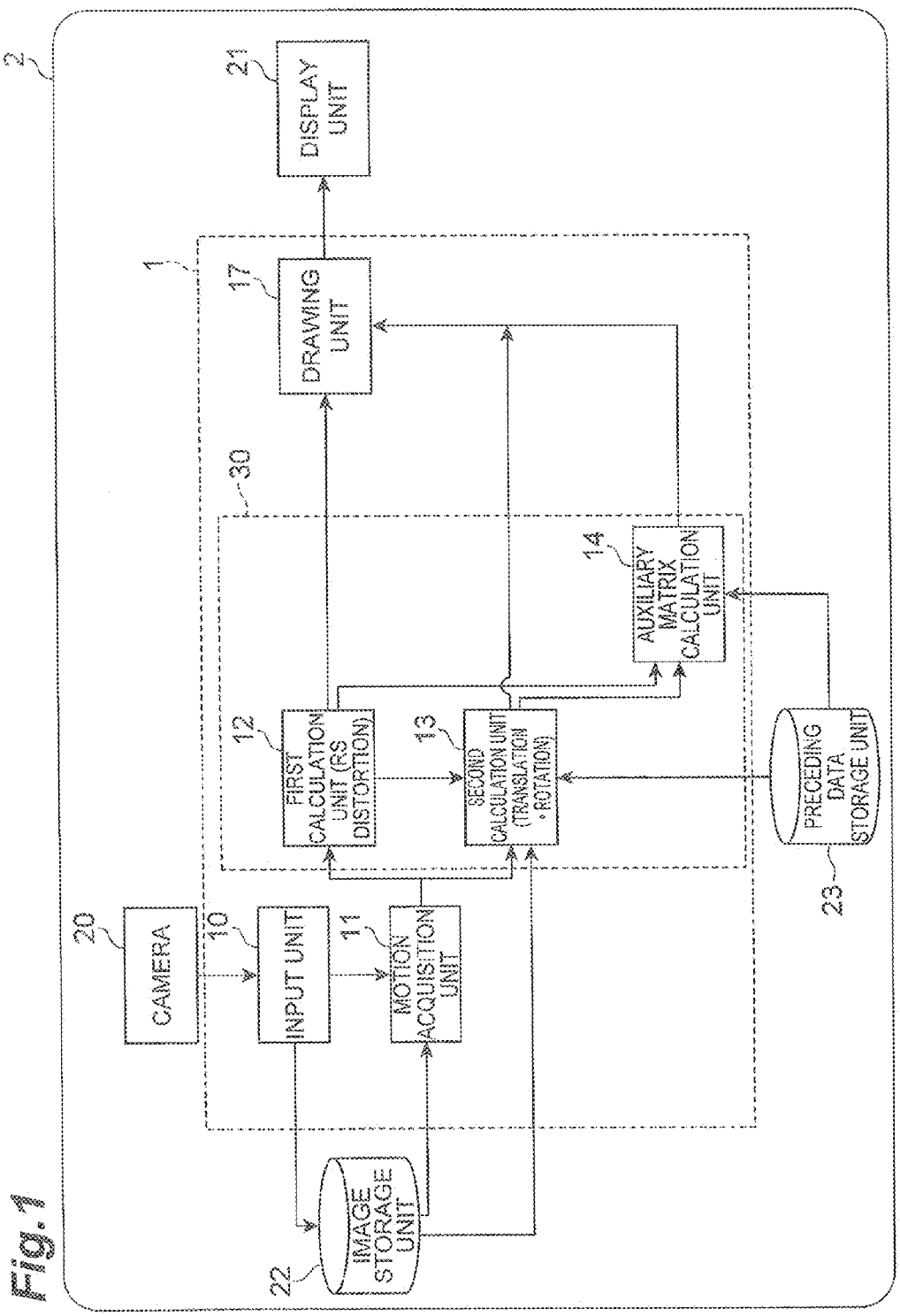
FIG. 1 is a functional block diagram of a portable terminal equipped with an image processing device according to an embodiment.

Embodiments will be described below with reference to the accompanying drawings. Identical or equivalent portions will be denoted by the same reference signs in the drawings, without redundant description.

An image processing device according to the present embodiment is a device that outputs an image after eliminating the defect such as the camera shake or the rolling shutter distortion of the image. The image processing device according to the present embodiment is adopted, for example, in continuous shooting of images or in video shooting. The image processing device according to the present embodiment is suitably mounted on a mobile terminal with limited resources, e.g., a cell phone, a digital camera, a PDA (Personal Digital Assistant), or the like, but, without having to be limited to these, it may be mounted, for example, on an ordinary computer system. The below will describe the image processing device to be mounted on a portable terminal equipped with a camera function, as an example, in view of easiness of understanding of description.

Figure 2:
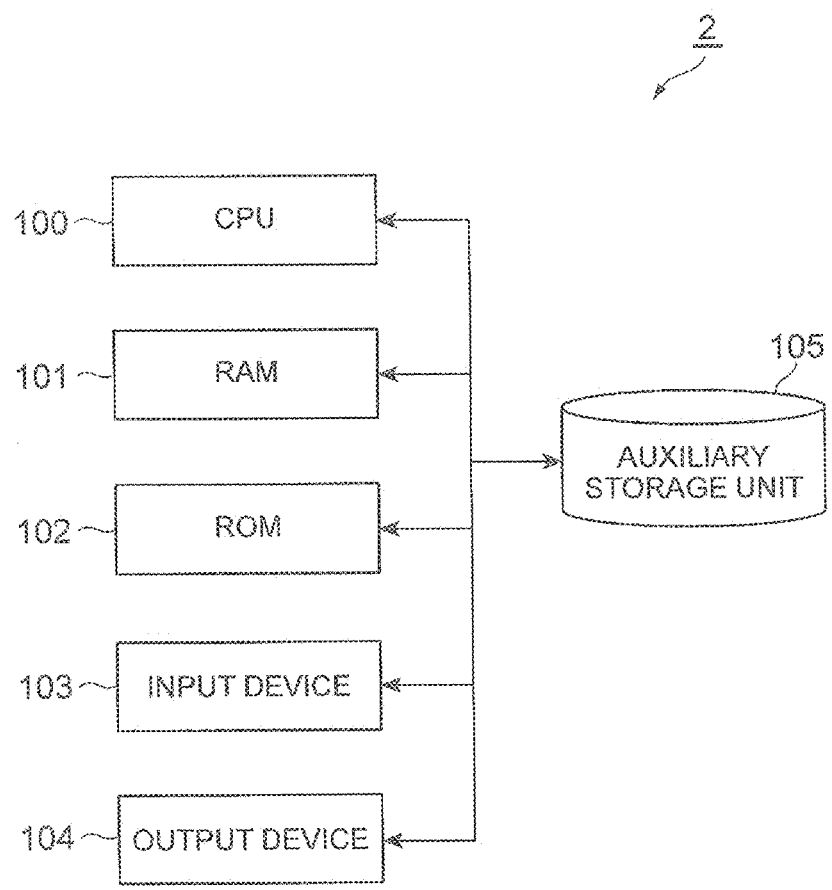
FIG. 2 is a hardware configuration diagram of the portable terminal on which the image processing device according to the embodiment is mounted.

FIG. 1 is a function block diagram of a portable terminal 2 provided with the image processing device 1 according to the present embodiment. The portable terminal 2 shown in FIG. 1 is, for example, a mobile terminal carried by a user and has a hardware configuration shown in FIG. 2. FIG. 2 is a hardware configuration diagram of the portable terminal 2. As shown in FIG. 2, the portable terminal 2 is constructed, from the physical view, as an ordinary computer system including a CPU (Central Processing Unit) 100, main storage devices such as a ROM (Read Only Memory) 101 and a RAM (Random Access Memory) 102, an input device 103 such as a camera or a keyboard, an output device 104 such as a display, an auxiliary storage device 105 such as a hard disc, and so on. Each of below-described functions of the portable terminal 2 and image processing device 1 is implemented by loading predetermined computer software on the hardware such as the CPU 100, ROM 101, and RAM 102, thereby letting the input device 103 and output device 104 operate under control of the CPU 100, and carrying out readout and writing of data from and into the main storage devices and auxiliary storage device 105. Although the above device was described as the hardware configuration of the portable terminal 2, the image processing device 1 may be constructed as an ordinary computer system including the CPU 100, the main storage devices such as the ROM 101 and RAM 102, the input device 103, the output device 104, the auxiliary storage device 105, and so on. In addition, the portable terminal 2 may be equipped with a communication module or the like.

As shown in FIG. 1, the portable terminal 2 has a camera (imaging device) 20, the image processing device 1, an image storage unit 22, a preceding data storage unit 23, and a display unit 21. The camera 20 has a function to generate an image. The camera 20 to be used herein is, for example, a CMOS pixel sensor or the like and generates an image by the focal plane shutter method. Namely, the camera 20 is configured to scan an image vertically or horizontally to achieve input of pixel values. The camera 20 has a continuous image-shooting function, for example, to repetitively generate images at predetermined intervals from the timing designated by a user's manipulation or the like. Namely, the camera 20 has a function to acquire not only still pictures (still frame images) but also videos (continuous moving frame images). The user can freely shoot images, for example, by sliding the camera 20, rotating the camera from an origin at a predetermined position, tilting the camera in a left, right, up, or down direction, or combining the foregoing actions. The camera 20 has a function to output to the image processing device 1, for example, a shot frame image every time of taking of an image. The display unit 21 is a display device that can display an image or a video.

The image processing device 1 has a function to output a frame image after eliminating the defect such as the camera shake or the rolling shutter distortion. Let us define, for example as shown in (A) and (B) of FIG. 3, frame images continuously generated by the camera 20, as $frame^{i-1}$ and $frame^i$ and center positions thereof as $Cf^{i-1}$ and $Cf^i$. The image processing device 1 sets a clipping region $K^{i-1}$ of a size smaller than the frame image $frame^{i-1}$. For example, the size of the clipping region $K^{i-1}$ is from 70 to 90% of the size of the frame image $frame^{i-1}$. A center position of the clipping region $K^{i-1}$ is $Cr^{i-1}$. This clipping region $K^{i-1}$ is output as an output frame image. Next, let us suppose that the camera 20 is moved from the image-shooting position shown in (A) to the image-shooting position shown in (B) (or shifted in an upper right direction indicated by a solid arrow in (B) of FIG. 3). In this case, the camera generates a frame image $frame^i$ shifted upper right from the frame image $frame^{i-1}$. At this point, the image processing device 1 sets a clipping region $K^i$ at a position where the motion between the frame image $frame^{i-1}$ and the frame image $frame^i$ is cancelled out (or shifts the clipping region in a lower left direction indicated by a dotted arrow in (B) of FIG. 3). This makes the center position $Cr^i$ of the current clipping region $K^i$ approximately equal to the center position $Cr^{i-1}$ of the preceding clipping region $K^{i-1}$ and thus the output frame image is generated as if it were still, and is output to the display unit 21.

The following will describe the details of the image processing device 1. As shown in FIG. 1, the image processing device 1 has an input unit 10, a motion acquisition unit 11, a calculation unit (matrix operation unit) 30, and a drawing unit 17.

The input unit 10 has a function to implement input of a frame image generated by the camera 20. The input unit 10 has, for example, a function to implement input of a frame image generated by the camera 20, every time of taking of an image. Furthermore, the input unit 10 has a function to store the frame image into the image storage unit 22 provided in the portable terminal 2. In addition, the input unit 10 has a function to output an input frame image to the motion acquisition unit 11.

The motion acquisition unit 11 has a function to acquire motion between frame images, using an input frame image (second frame image) and a frame image (first frame image) generated immediately before the foregoing input frame image or generated previously. The first frame image is, for example, one stored in the image storage unit 22. The motion acquisition unit 11 refers to the image storage unit 22 to obtain a frame image input in the past, as a reference frame image, and acquires relative motion data between the reference frame image and the input frame image. It is noted that the reference frame image may be a frame image having an overlap of not less than a predetermined area with the input frame image as a processing target. For this reason, the motion acquisition unit 11 does not have to change the reference frame image every input of the input frame image and may be configured to update the reference frame image for the next or subsequent input frame image when the current reference frame image comes to lose the overlap of not less than the predetermined area with the input frame image as a processing target. If the motion is acquired with reference to three or more frame images, instead of two frame images, the immediately preceding input frame image is defined as a temporary reference frame image and the motion is acquired by comparing the input frame image as a processing target with the already-set reference frame image and the temporary reference frame image. The motion acquisition unit 11 compares the frame images to acquire motion data P (observations), for example, according to eight degrees of freedom. The motion acquisition unit 11 outputs the motion data P to the calculation unit 30. It is noted that the motion acquisition unit 11 may acquire the motion data P by taking in an output value of a gyro sensor provided in the portable terminal 2. The gyro sensor has a function to detect and output the motion data P between the reference frame image and the input frame image.

Figure 4:
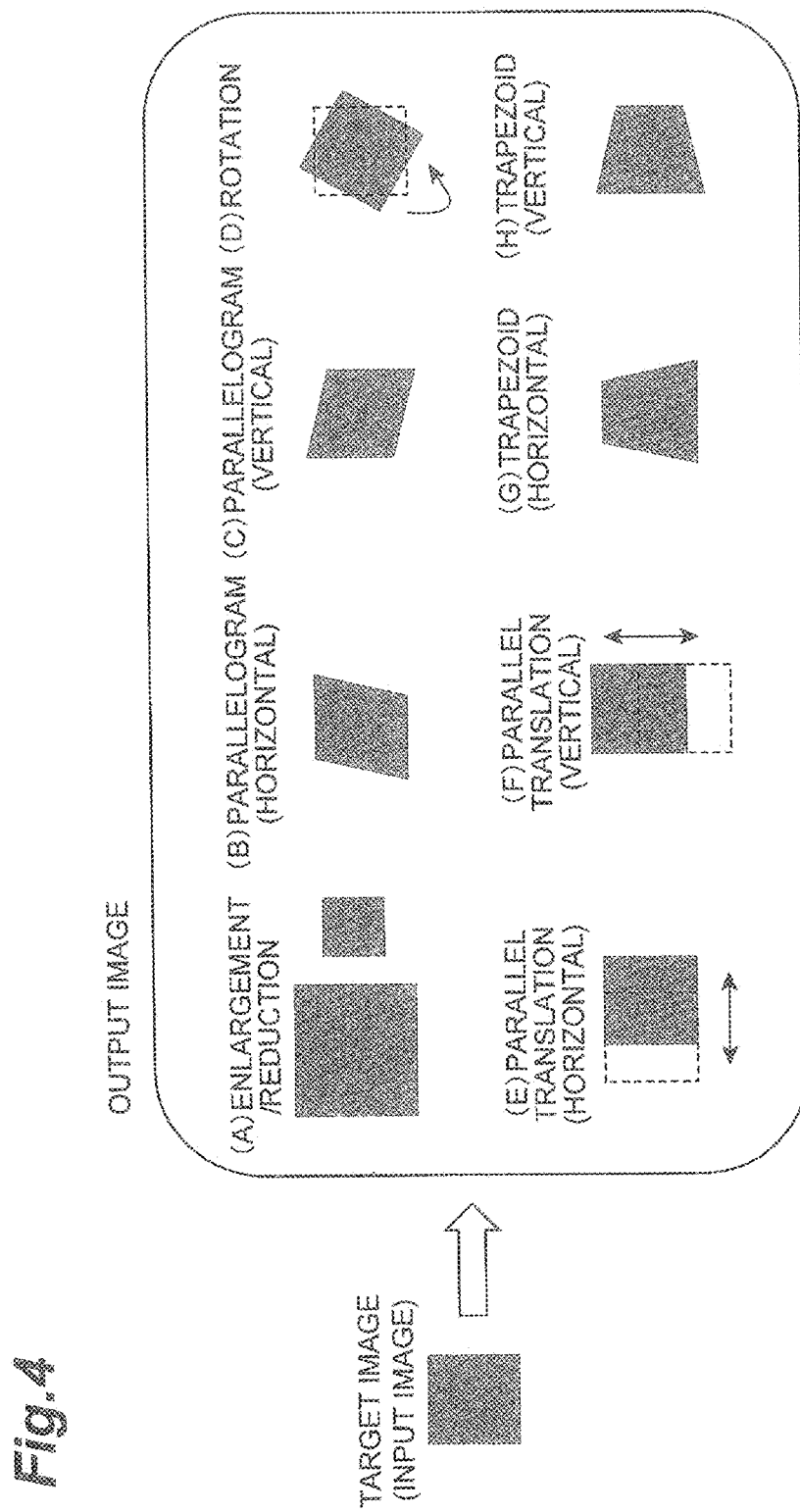
FIG. 4 is a schematic drawing for explaining motion of an image.

The motion according to eight degrees of freedom will be summarized below. FIG. 4 is a schematic drawing for explaining the motion according to eight degrees of freedom. As shown in FIG. 4, for example, when an image before deformation is assumed to be square, the image can be deformed into (A) to (H) because of motion of the camera 20. (A) is enlargement/reduction, (B) parallelogram (in the horizontal direction), (C) parallelogram (in the vertical direction), (D) rotation, (E) parallel translation (in the horizontal direction), (F) parallel translation (in the vertical direction), (G) trapezoid (in the horizontal direction), and (H) trapezoid (in the vertical direction). For this reason, the image processing device 1 set the clipping region $K^I$ according to the foregoing deformation.

Figure 5:
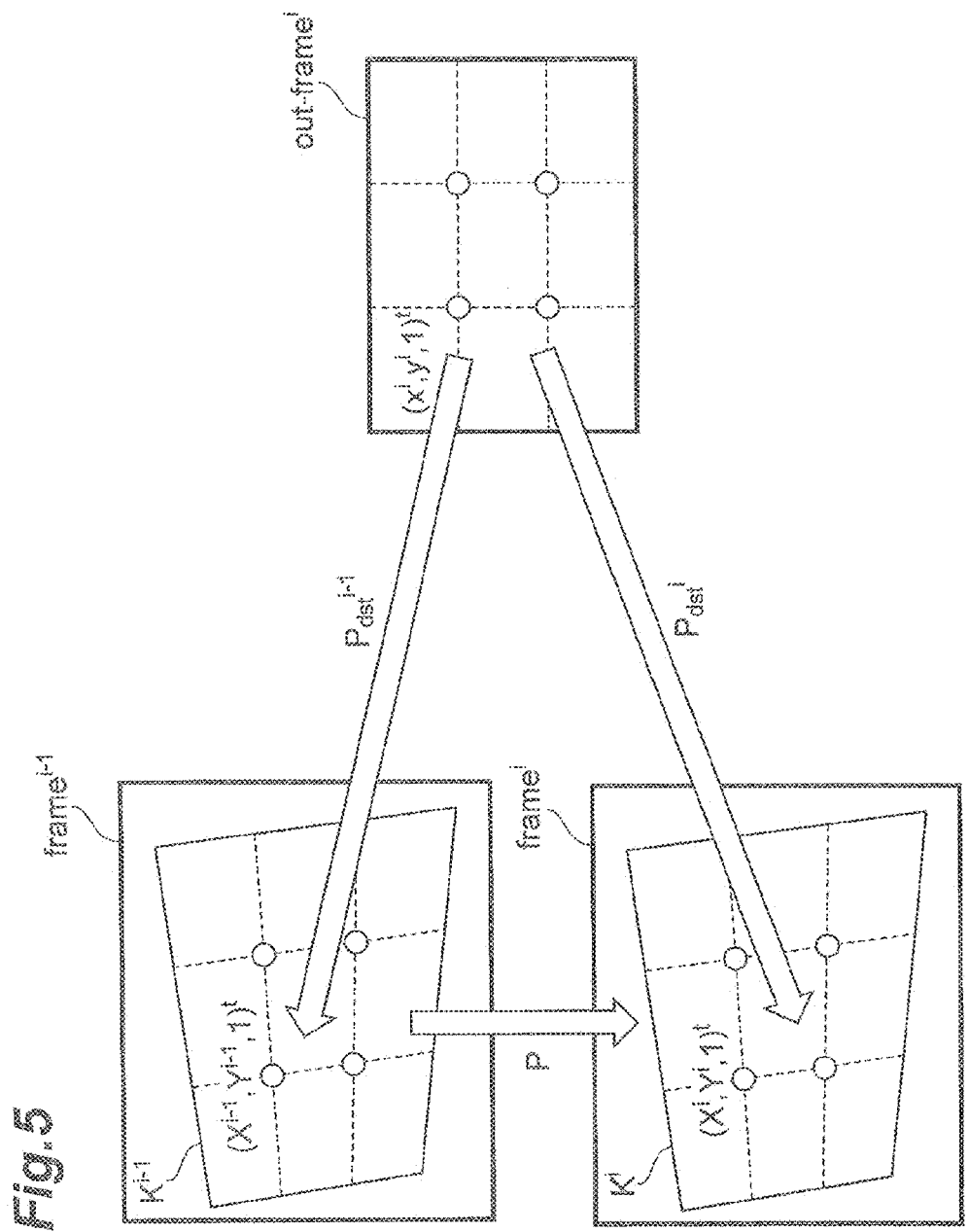
FIG. 5 is a schematic drawing for explaining a relation among a reference frame image, a target frame image, and an output frame image.

The following will describe a relationship among the motion data P, the clipping region $K^{i-1}$, the clipping region $K^i$, and a projection matrix. FIG. 5 is a schematic drawing showing a relationship among the reference frame image frame$^{i-1}$, the processing target frame image frame$^i$, their respective clipping regions $K^{i-1}$, $K^i$, and the output frame image out-frame$^i$. In FIG. 5, the motion data (motion vector) between the reference frame image frame$^{i-1}$ and the processing target frame image frame$^i$ is represented by P. The motion data P is known data acquired by the motion acquisition unit 11. Furthermore, a conversion expression (projection matrix) to associate the clipping region $K^{i-1}$ of the reference frame image frame$^{i-1}$ with the output frame image out-frame$^{i-1}$ is represented by $P_{dst}^{i-1}$. The projection matrix $P_{dst}^{i-1}$ will also be referred to hereinafter as a preceding projection matrix or first projection matrix. Since the projection matrix $P_{dst}^{i-1}$ consists of values calculated in the preceding operation, it is known. The projection matrix $P_{dst}^{i-1}$ is stored, for example, in the preceding data storage unit 23. In this case, as shown in FIG. 5, a conversion expression (projection matrix) $P_{dst}^i$ to associate the clipping region $K^i$ of the frame image frame$^i$ with the output frame image out-frame$^i$ can be calculated by Formula (1) below, using the motion data P and the first projection matrix $P_{dst}^{i-1}$.

[Math 1]

$$P_{dst}^i = P \cdot P_{dst}^{i-1} \quad (1)$$

The projection matrix $P_{dst}^i$ will also be referred to hereinafter as a second projection matrix.

It is noted herein that the condition of Formula (1) is a mode of completely fixing the clipping region. It is necessary, however, to eliminate the defect such as the camera shake, while following the motion intended by the user (e.g., parallel movement, panning, or tilting of the camera). For example, a high-pass filer is used to subject the motion intended by the user and the motion to cause the defect, to filtering. In this case, the second projection matrix $P_{dst}^i$ is given by Formula (2) below.

[Math 2]

$$P_{dst}^i = HPF(P \cdot P_{dst}^{i-1}) \quad (2)$$

In this formula HPF represents the high-pass filter. Specifically, the filter passes high-frequency components resulting from the camera shake or the like so as to fix the screen but cuts low-frequency components resulting from the motion intended by the user, so as to make the screen follow the user's motion.

Figure 6:
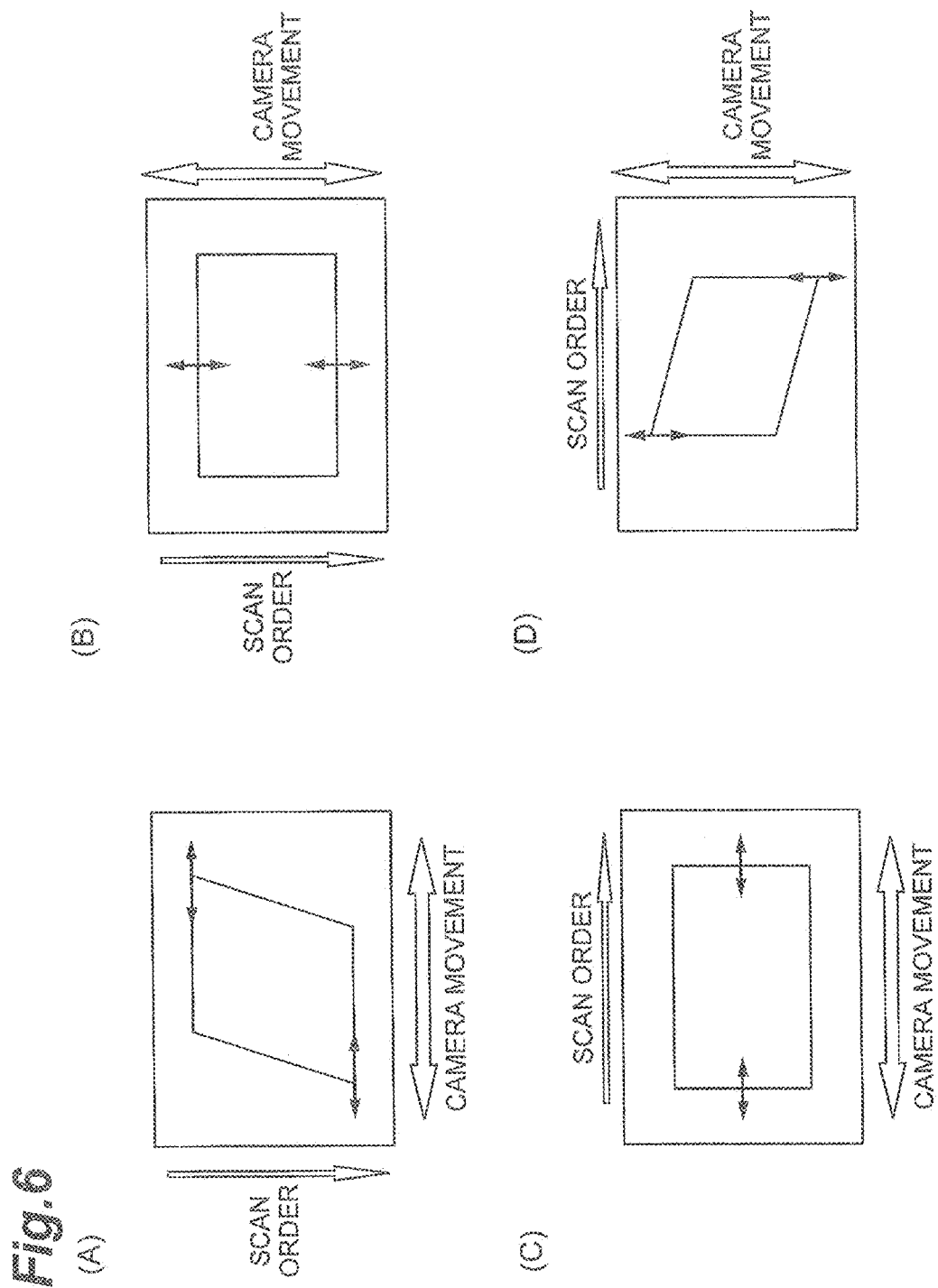
FIG. 6 is a schematic drawing for explaining rolling shutter distortion. (A) shows distortion of a subject in a case where a scanning order of scanning of X-directional lines is set along a Y-direction and where a camera is moved along an X-direction. (B) shows distortion of the subject in a case where the scanning order of scanning of X-directional lines is set along the Y-direction and where the camera is moved along the Y-direction. (C) shows distortion of the subject in a case where the scanning order of scanning of Y-directional lines is set along the X-direction and where the camera is moved along the X-direction. (D) shows distortion of the subject in a case where the scanning order of scanning of Y-directional lines is set along the X-direction and where the camera operation is moved along the Y-direction.

However, the motion data P includes the rolling shutter distortion component. FIG. 6 is a schematic drawing for explaining the rolling shutter distortion component. The rolling shutter distortion is a phenomenon, as shown in (A) of FIG. 6, in which when the camera 20 is horizontally moved relative to a subject, the subject is horizontally distorted into a parallelogram. When the camera 20 is vertically moved, the rolling shutter distortion appears so as to vertically enlarge or reduce the subject, as shown in (B) of FIG. 6. Since the rolling shutter distortion component always needs to be corrected, it is the component that should always pass through the high-pass filter. Namely, the high-pass filter does not have to be applied to the rolling shutter distortion component. Therefore, a scheme to be constructed is one which follows the user-intended motion but eliminates the defect such as the camera shake, in a state in which the rolling shutter distortion component is separated.

Figure 7:
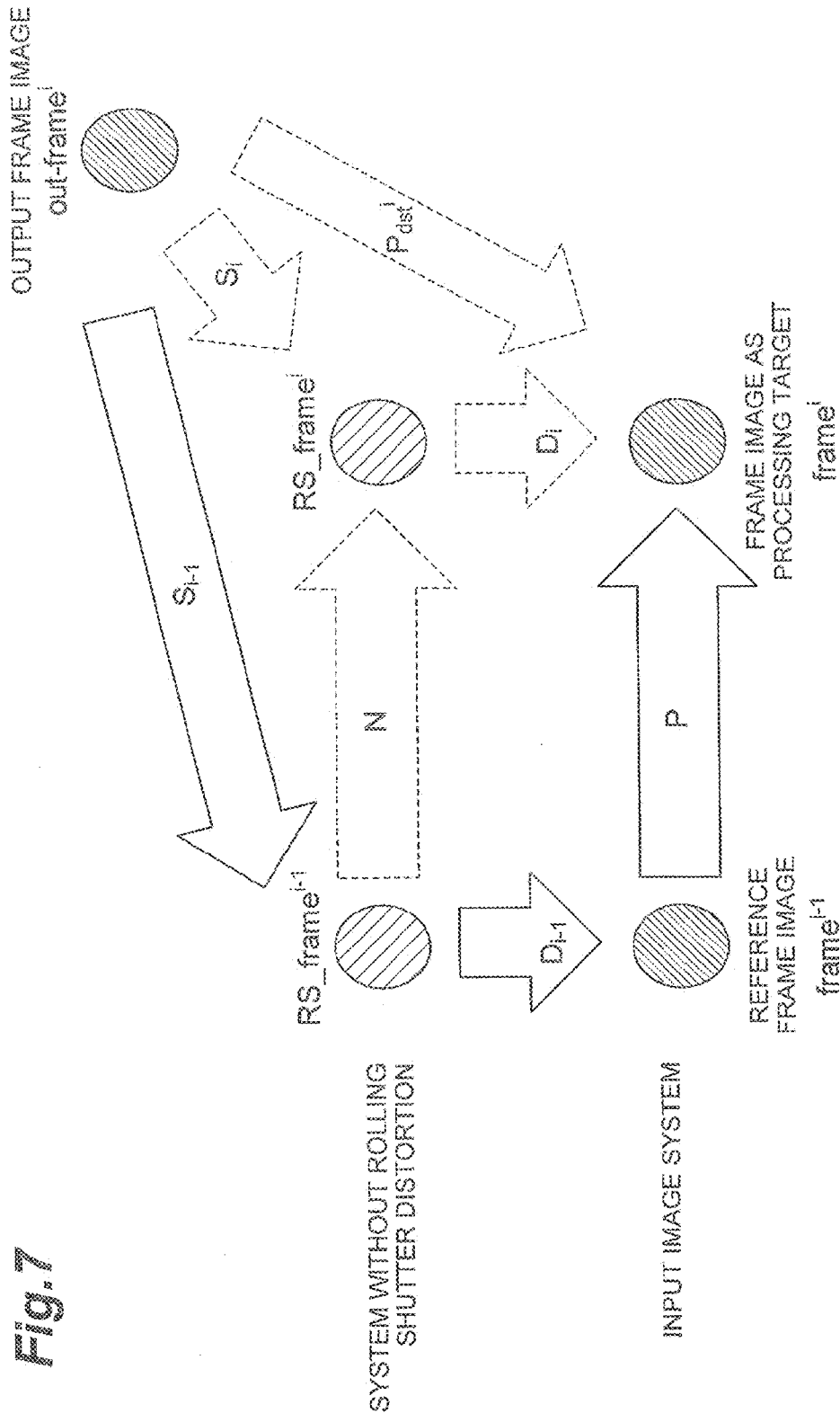
FIG. 7 is a schematic drawing for explaining a system without rolling shutter distortion.

FIG. 7 is a schematic drawing for explaining the foregoing scheme. As shown in FIG. 7, let us assume that there is a processing target frame image frame$^i$ moved by the motion data P from the reference frame image frame$^{i-1}$. In FIG. 7, known values are indicated by solid arrows and unknown values by dotted arrows. An arrow P represents the motion data (motion vector), which is known. An arrow $D_{i-1}$ is an operator (first matrix $D_{i-1}$) indicative of the rolling shutter distortion component of the reference frame image frame$^{i-1}$. The first matrix $D_{i-1}$ consists of values determined in the preceding operation and is thus known. The first matrix $D_{i-1}$ is stored, for example, in the preceding data storage unit 23. By using the first matrix $D_{i-1}$, the frame image in the input image system can be converted into the frame image in a system without rolling shutter distortion.

FIG. 7 shows the "system without rolling shutter distortion" and the system does not have to be a system from which the rolling shutter distortion is completely removed, but may be a system from which the rolling shutter distortion is reduced to a certain degree. For example, when the first matrix $D_{i-1}$ consists of accurate values, the frame image in the input image system is converted into the frame image in the system in which the rolling shutter distortion is perfectly absent. However, when the first matrix $D_{i-1}$ does not consist of accurate values, the frame image in the input image system is converted into the frame image in the system in which the rolling shutter distortion is reduced. In this manner, the accuracy of the first matrix $D_{i-1}$ affects a level of how much the rolling shutter distortion component is not taken into consideration. For this reason, when the first matrix $D_{i-1}$ that is provisionally probable is used, the frame image can be converted into the system with reduced rolling shutter distortion and, in this case, it becomes possible to achieve a state in which the rolling shutter distortion component is separated to some extent. Namely, the scheme in the present embodiment allows for some error in removal of the rolling shutter distortion.

In FIG. 7, an image resulting from reduction of the rolling shutter distortion from the reference frame image frame$^{i-1}$ is designated by RS_frame$^{i-1}$. A matrix $S_{i-1}$ indicated by an arrow is a vector (projection matrix) that associates the output frame image out-frame$^i$ with the clipping region of RS_frame$^{i-1}$. Since the projection matrix $S_{i-1}$ consists of values determined in the preceding operation, it is known.

The projection matrix $S_{i-1}$ can be calculated, for example, using the first projection matrix $P_{dst}^{i-1}$ and the first matrix $D_{i-1}$ determined in the preceding operation. The projection matrix $S_{i-1}$ is stored, for example, in the preceding data storage unit 23. The projection matrix $S_{i-1}$ will also be referred to hereinafter as a first projection matrix in the system from which the rolling shutter distortion component is reduced.

As shown in FIG. 7, if we can convert the processing target frame image frame$^i$ into an image RS_frame$^i$ in the system without rolling shutter distortion, we can calculate motion data N in the system without rolling shutter distortion. The motion data N will also be referred to thereinafter as provisional motion data. Once we find the motion data N in the system with reduced rolling shutter distortion, a projection matrix $S_i$ in the system with reduced rolling shutter distortion (a second projection matrix in the system with reduced rolling shutter distortion), which associates the clipping region of RS_frame$^i$ with the output frame image out-frame$^i$, can be expressed by Formula (3) below, similar to Formula (2).

[Math 3]

$$S_i = HPF(N \cdot S_{i-1}) \quad (3)$$

Using the projection matrix $S_i$ in the system with reduced rolling shutter distortion, the second projection matrix $P_{dst}^i$ is expressed by Formula (4) below.

[Math 4]

$$P_{dst}^i = D_i \cdot S_i = D_i \cdot HPF(N \cdot S_{i-1}) \quad (4)$$

The conversion into the system with reduced rolling shutter distortion as described above allows us to apply the high-pass filter only to $N \cdot S_{i-1}$ in no consideration of the rolling shutter distortion.

The calculation unit 30 is an operation unit for realizing the foregoing scheme. Namely, the calculation unit 30 calculates the second projection matrix $P_{dst}^i$ to project the output frame image to the second frame image, using the preceding data already calculated and stored in the preceding data storage unit 23 and the current data as measurements.

The below will describe a situation in which the preceding data storage unit 23 stores the first matrix $D_{i-1}$ indicative of the rolling shutter distortion component, the preceding motion data $N_{PRE}$ in the system with reduced rolling shutter distortion between frame images which have been input before the input of the second frame image, the preceding second matrix and preceding correction matrix between frame images input before input of the second frame image, and, the projection matrix $S_{i-1}$ in the system with reduced rolling shutter distortion. The second matrix and correction matrix will be detailed later.

The calculation unit 30 calculates the second projection matrix $P_{dst}^i$ to project the output frame image to the second frame image, from the first matrix $D_i$ including the rolling shutter distortion component, the second matrix including at least one of a parallel translation component in directions perpendicular to the image-shooting direction and a rotation component with respect to the image-shooting direction, and an auxiliary matrix not including the motion components included in the first matrix $D_i$ and the second matrix. Namely, the calculation unit 30 calculates the second projection matrix $P_{dst}^i$ in the separated state into the first matrix $D_i$, the second matrix, and the auxiliary matrix independently of each other. The calculation unit 30 has a first calculation unit 12, a second calculation unit 13, and an auxiliary matrix calculation unit 14.

The first calculation unit 12 calculates the first matrix $D_i$ including the rolling shutter distortion component. The first calculation unit 12 has a function to calculate the rolling shutter distortion component, based on the parallel translation component. The distortion amount increases according to increase in speed of translation of the camera 20. From this fact, it can be said that the rolling shutter distortion can be estimated using the speed of translation of the camera 20. The speed of translation of the camera 20 can be estimated using an amount of parallel translation between frames. Therefore, the first calculation unit 12 calculates the first matrix $D_i$ including the rolling shutter distortion component, for example, based on the parallel translation amount included in the motion data P. When the preceding motion data is denoted by $P_{i-1}$ and the current motion data by $P_i$, the parallel translation amount may be assumed to be an average of parallel translation amounts included in the motion data $P_{i-1}$ and the motion data $P_i$. The rolling shutter distortion component is expressed by Formula (5) below, where a coordinate system with distortion is represented by $(x^i, y^i, 1)^t$ and a coordinate system without distortion by $(X^i, Y^i, 1)^t$.

[Math 5]

$$\begin{pmatrix} x^i \\ y^i \\ 1 \end{pmatrix} = \begin{pmatrix} 1 & \alpha \cdot d_x^i & 0 \\ 0 & 1+\alpha \cdot d_y^i & 0 \\ 0 & 0 & 1 \end{pmatrix} \begin{pmatrix} X^i \\ Y^i \\ 1 \end{pmatrix} \quad (5)$$

As shown in Formula (5) above, the value of Y affects the distortion component. It is noted herein that $d_x^i$ and $d_y^i$ included in the rolling shutter distortion component represent the parallel translation component of the image and $\alpha$ is a distortion coefficient. The distortion coefficient $\alpha$ is a value calculated by dividing a duration of time for retrieving one line of a frame image by the sum of a duration of time for retrieving the entire frame image and a duration of time up to a start of retrieval of the next frame image. In other words, the distortion coefficient $\alpha$ is a value calculated by dividing the duration for retrieval of one line of a frame image by a duration from a time of a start of retrieval for the first line of the frame image to a time of a start of retrieval for the first line of the next frame image. The distortion coefficient $\alpha$ varies depending upon specifications of the pixel sensor in the camera 20 and/or settings for drive of the pixel sensor. For example, each of pixel sensors has different setting information, e.g., such as the scan speed, frame rate, exposure duration, pixel size, direction of scanning lines, zoom ratio, f-value, ON/OFF of mechanical camera shake correction mechanism, duration from taking of a frame to output, reading speed, reading direction, and so on. For this reason, it is necessary to preliminarily calculate the distortion coefficient $\alpha$ for each of image-shooting conditions including the various settings of the imaging device (image sensor), image-shooting modes, or environmental conditions, prior to the estimation of the distortion. In the pixel sensor, where $t_L$ represents a time difference between adjacent lines and $t_F$ a time difference between adjacent frames, the distortion coefficient $\alpha$ can be calculated by the below formula. It is noted that the time difference $t_F$ between adjacent frames can be derived based on the frame rate of a moving frame image sequence.

[Math 6]

$$\alpha = \frac{t_L}{t_F}$$

When $N_L$ represents the number of lines of the frame image (the height of the image), the following inequality holds.

[Math 7]

$$t_L = \frac{t_L}{N_L}$$

The above inequality can be modified as follows.

[Math 8]

$$\alpha \leq \frac{1}{N_L}$$

As understood from the above, the upper limit of the distortion coefficient α can be determined when the number $N_L$ of lines of the frame image is known.

Figure 8:
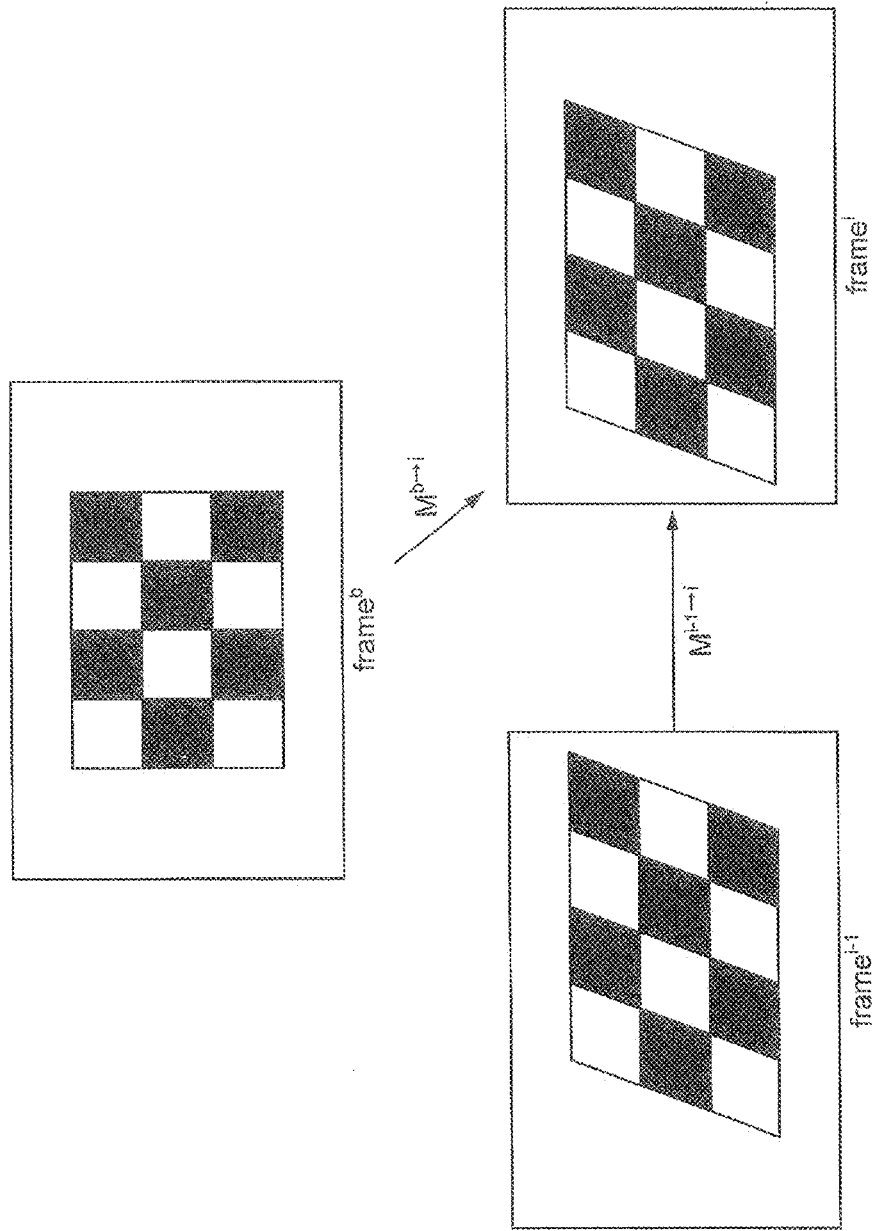
FIG. 8 is a schematic drawing for explaining a method for calculating a distortion coefficient.

A method for calculating the distortion coefficient α will be described below. FIG. 8 is a schematic drawing for explaining the method for calculating the distortion coefficient α. As shown in FIG. 8, the distortion coefficient α is calculated using a still frame image frame$^b$ and a moving frame image sequence frame$^i$. The still frame image and a moving frame image are compared to obtain how much distortion is generated and, further a parallel translation amount between moving frame images is obtained, thereby a correlation between the distortion and the parallel translation amount is obtained. The distortion coefficient α is calculated from this correlation.

Specifically, the still frame image frame$^b$ is first generated with the subject and the camera 20 being kept stationary. Next, the subject or the camera 20 is moved to generate a moving frame image sequence: frame$^0$, frame$^1$, frame$^2$, . . . , frame$^{i-1}$, frame$^i$. The distortion amount in the moving frame image frame$^i$ can be calculated by calculating a motion matrix $M^{b \rightarrow i}$ from the still frame image frame$^b$ to the moving frame image frame$^i$. The distortion amount is expressed by Formula (6) below, where a coordinate system for the still frame image frame$^b$ is defined by ($x^b$, $y^b$, 1) and a coordinate system for the moving frame image frame$^i$ by ($x^i$, $y^i$, 1).

[Math 9]

$$\begin{pmatrix} x^i \\ y^i \\ 1 \end{pmatrix} = \begin{pmatrix} m_{00}^{b \rightarrow i} & m_{01}^{b \rightarrow i} & m_{02}^{b \rightarrow i} \\ m_{10}^{b \rightarrow i} & m_{11}^{b \rightarrow i} & m_{12}^{b \rightarrow i} \\ 0 & 0 & 1 \end{pmatrix} \begin{pmatrix} x^b \\ y^b \\ 1 \end{pmatrix} \quad (6)$$

When it is assumed herein that the motion matrix $M^{b \rightarrow i}$ consists of only the parallel translation component and the distortion component, the distortion amount can be approximated to Formula (7) below.

[Math 10]

$$\begin{pmatrix} x^i \\ y^i \\ 1 \end{pmatrix} = \begin{pmatrix} 1 & m_{01}^{b \rightarrow i} & m_{02}^{b \rightarrow i} \\ 0 & m_{11}^{b \rightarrow i} & m_{12}^{b \rightarrow i} \\ 0 & 0 & 1 \end{pmatrix} \begin{pmatrix} x^b \\ y^b \\ 1 \end{pmatrix} = C \cdot \begin{pmatrix} x^b \\ y^b \\ 1 \end{pmatrix} \quad (7)$$

Let us compare Formula (5) with Formula (7). In Formula (7), the distortion component is $m_{01}^{b \rightarrow i}$ and $m_{11}^{b \rightarrow i}$. On the other hand, in Formula (5), the origin of the distortion component is the parallel translation amounts $(d_x^i, d_y^i)^t$ being the motion component between continuous frames. To determine the parallel translation amounts, a motion matrix $M^{i-1 \rightarrow i}$ is determined from the moving frame image frame$^i$ and the moving frame image frame$^{i-1}$ one frame before it. A relation between the moving frame image frame$^i$ and the moving frame image frame$^{i-1}$ one frame before it can be expressed by Formula (8) below.

[Math 11]

$$\begin{pmatrix} x^i \\ y^i \\ 1 \end{pmatrix} = \begin{pmatrix} m_{00}^{i-1 \rightarrow i} & m_{01}^{i-1 \rightarrow i} & m_{02}^{i-1 \rightarrow i} \\ m_{10}^{i-1 \rightarrow i} & m_{11}^{i-1 \rightarrow i} & m_{12}^{i-1 \rightarrow i} \\ 0 & 0 & 1 \end{pmatrix} \begin{pmatrix} x^{i-1} \\ y^{i-1} \\ 1 \end{pmatrix} \quad (8)$$

Using above Formula (8), the motion component $(m_{02}^{i-1 \rightarrow i}, m_{12}^{i-1 \rightarrow i})^t$ between the frames may be defined as the parallel translation component $(d_x^i, d_y^i)^t$. Furthermore, parallel translation amounts of center coordinates of the moving frame image frame$^i$ may be defined as $(d_x^i, d_y^i)^t$. Yet furthermore, the parallel translation amounts may be determined by calculating first parallel translation amounts using the frame image frame$^i$ and the immediately preceding frame image frame$^{i-1}$ among the continuous frame images, calculating second parallel translation amounts using the frame image frame$^i$ and the immediately subsequent frame image frame$^{i+1}$, and calculating averages of the first parallel translation amounts and the second parallel translation mounts (by weighted averaging, polynomial approximation, or the like) as the parallel translation amounts. Use of average parallel translation amounts allows improvement in accuracy. As $(d_x^i, d_y^i)^t$ are calculated, the distortion coefficient α can be expressed by Formulas (9), (10) below.

[Math 12]

$$\alpha = \frac{m_{01}^{b \rightarrow i}}{d_x^i} \quad (9)$$

[Math 13]

$$\alpha = \frac{m_{11}^{b \rightarrow i} - 1}{d_y^i} \quad (10)$$

Figure 9:
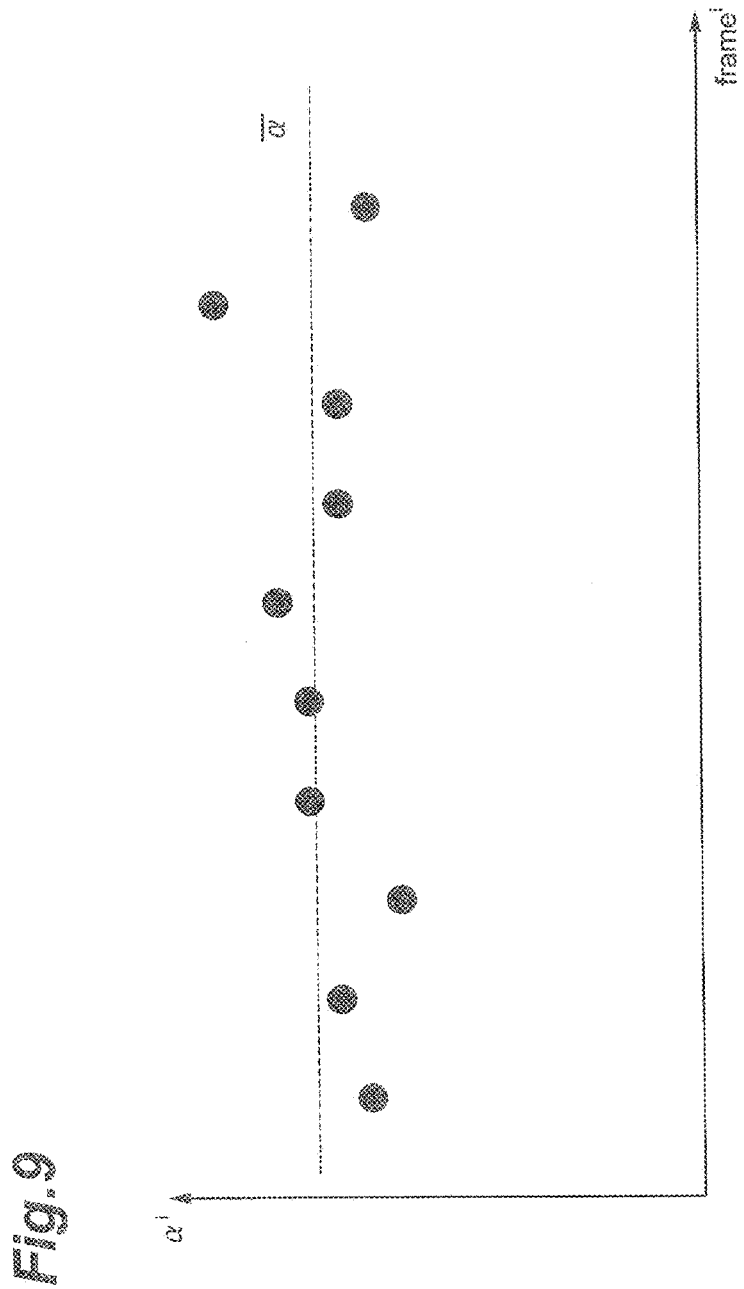
FIG. 9 is a graph showing a relation between moving frame image and distortion count.
Figure 10:
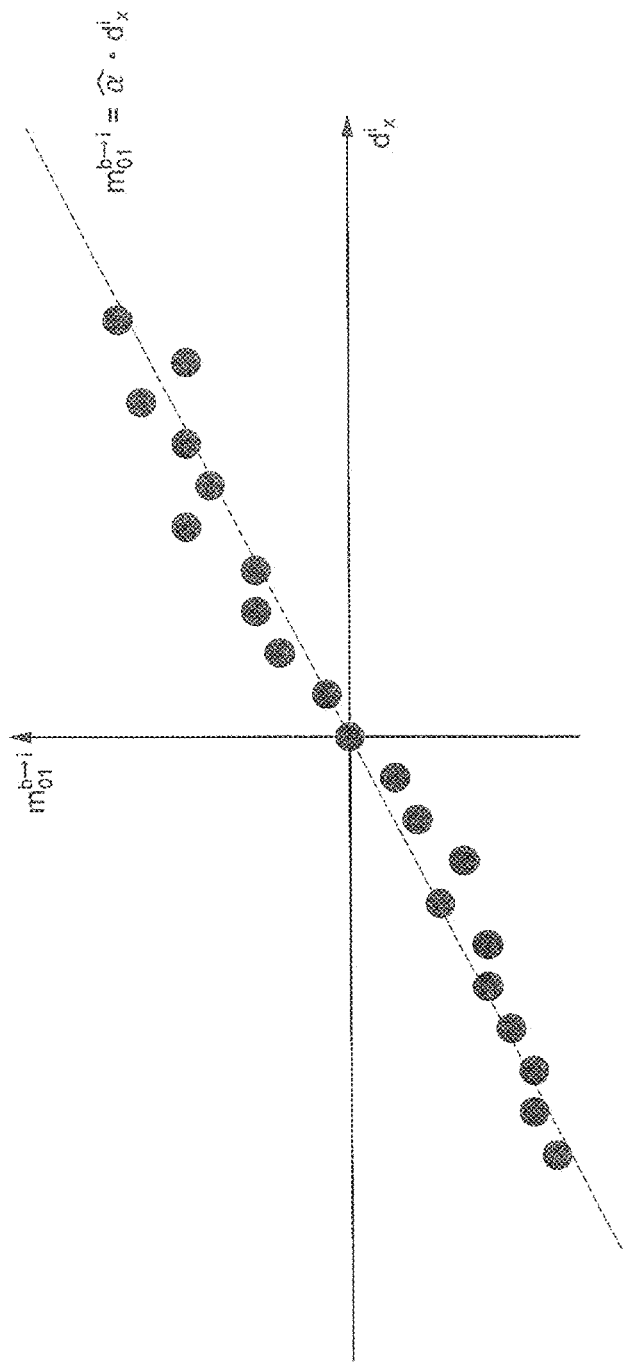
FIG. 10 is a graph showing a relation between motion matrix component and movement amount.

Now, we can determine the distortion coefficient α by measuring $m_{01}^{b \rightarrow i}$, $m_{11}^{b \rightarrow i}$, $d_x^i$, and $d_y^i$ in one frame image frame$^i$ and using Formula (9) or Formula (10). It is assumed, however, that $m_{01}^{b \rightarrow i}$, $m_{11}^{b \rightarrow i}$, $d_x^i$, and $d_y^i$ as measurements for determining the distortion coefficient α may include error. For this reason, the distortion coefficient α may be calculated as follows: a distortion coefficient obtained for one frame image frame$^i$ is defined as a provisional distortion coefficient, the provisional distortion coefficient is determined for each of a plurality of frame images, and these provisional distortion coefficients are used to obtain an accurate distortion coefficient α with convergence of error. FIG. 9 shows frame$^i$ on the horizontal axis and distortion coefficient α$^i$ on the vertical axis. As shown in FIG. 9, the provisional distortion coefficients α$^i$ are determined for a variety of frame$^i$ and an average of them (weighted average) may be adopted as the distortion coefficient α. As another example, the provisional distortion coefficients α$^i$ are determined for a variety of frame$^i$ and the median of them may be adopted as the distortion coefficient α. FIG. 10 shows translation amount d$_x^i$ on the horizontal axis and motion matrix component m$_{01}^{b \to i}$ on the vertical axis. As shown in FIG. 10, while they are plotted on a two-dimensional plane with the coordinate axes of the parallel translation amount and the rolling shutter distortion component, the distortion coefficient α may be determined from a slope of a regression line represented by Formula (10). Even in cases where the values of m$_{01}^{b \to i}$, m$_{11}^{b \to i}$, d$_x^i$, and d$_y^i$ as measurements are small and where the error has significant influence, the distortion coefficient α can be determined with accuracy by the foregoing techniques. It should be noted herein that the provisional distortion coefficient α$^i$ and the distortion coefficient α need to be not more than the aforementioned upper limit (the inverse of the number N$_L$ of lines of the frame image). For this reason, if the provisional distortion coefficient α$^k$ of a predetermined frame image frame$^k$ is larger than the inverse of the number N$_L$ of lines of the frame image, the distortion coefficient α may be calculated by the technique based on the average, median, or regression line as described above, after a correction is made to define the inverse of the number N$_L$ of lines of the frame image as the provisional distortion coefficient α$^k$ for the frame image frame$^k$. Alternatively, if the provisional distortion coefficient α$^k$ of a predetermined frame image frame$^k$ is larger than the inverse of the number N$_L$ of lines of the frame image, the distortion coefficient α may be calculated by the technique based on the average, median, or regression line as described above, while excluding the provisional distortion coefficient α$^k$ for the frame image frame$^k$. Furthermore, if the derived distortion coefficient α is larger than the inverse of the number N$_L$ of lines of the frame image, a correction may be made to define the inverse of the number N$_L$ of lines of the frame image as the distortion coefficient α. The rolling shutter distortion appears in different ways, depending upon specifications of the pixel sensor and/or the settings for drive of the pixel sensor. When the distortion coefficient α is calculated for each of the settings of the camera 20 or the pixel sensor by the aforementioned technique, we can estimate the rolling shutter distortion accurately while reflecting the conditions peculiar to the camera 20. When the distortion coefficient α is calculated using actual measurements, the device may be configured to also store information regarding under what image-shooting environmental conditions the distortion coefficient α was calculated. Examples of the image-shooting environmental conditions include "brightness" or "temperature" or the like.

The first calculation unit 12 is configured to be able to refer to the camera information storage unit storing the distortion coefficients α calculated by the above method. For example, it has a table of distortion coefficients α in association with device setting values. It may have a table of distortion coefficients α in association with device setting values and image-shooting environments. The first calculation unit 12 refers to the camera information storage unit to acquire the value of the distortion coefficient α according to the setting of the pixel sensor and estimates the rolling shutter distortion component with use of the camera motion component. The current setting information of the pixel sensor and the information regarding the image-shooting environment may be acquired, for example, from the camera 20. If the camera information storage unit stores the duration of retrieval of one line of the frame image and the duration of retrieval of the entire frame image and the duration up to retrieval of the next frame image in association with the setting information and the information regarding the image-shooting environment, the distortion coefficient α may be calculated based on the information stored in the camera information storage unit, instead of the direct acquisition of the distortion coefficient α from the camera information storage unit.

Since the first calculation unit 12 derives the first matrix D$_i$ in consideration of only the parallel translation as described above, it can obtain approximately accurate values though the first matrix D$_i$ thus calculated does not consist of true values. The first calculation unit 12 outputs the calculated first matrix D$_i$ to the second calculation unit 13, the auxiliary matrix calculation unit 14, and the drawing unit 17.

Once the first matrix D$_i$ is calculated, the processing target frame image frame$^i$ can be converted to the image RS_frame$^i$ in the system without rolling shutter distortion. This allows us to also derive the motion data N in the system with reduced rolling shutter distortion with the use of the motion data P and the first matrix D$_i$, by using the relation shown in FIG. 7.

By calculating the motion data N, it becomes feasible to apply the high-pass filter only to N·S$_{i-1}$ in no consideration of the rolling shutter distortion. However, since N·S$_{i-1}$ is a matrix, if the high-pass filter is applied in this matrix state of N·S$_{i-1}$, processing can possibly become complicated. For this reason, the calculation unit 30 handles the motion component of N·S$_{i-1}$ by dividing it into the motion of the camera 20 reflecting the user's intention and the other motion component. The second calculation unit 13 calculates the second matrix including the motion of the camera 20 reflecting the user's intention. The auxiliary matrix calculation unit 14 calculates the auxiliary matrix. The second calculation unit 13 and the auxiliary matrix calculation unit 14 are configured so as to be able to execute the operations in the system without rolling shutter distortion, using the calculated first matrix D$_i$.

The second calculation unit 13 estimates that the motion of the camera 20 reflecting the user's intention is at least one of the parallel translation component and the rotation component. It is noted that the second calculation unit 13 may calculate the motion while definitely separating the parallel translation component and the rotation component as components or may calculate a complex motion component (combinational component) of the parallel translation component and the rotation component. For example, when z-axis is defined as an axis extending in the image-shooting direction and x-axis and y-axis are defined as axes extending in directions perpendicular to the image-shooting direction, the second calculation unit 13 may calculate a combinational component of the parallel translation component and the rotation component about the x-axis and the y-axis. The second calculation unit 13 may estimate the motion in consideration of an enlargement/reduction component as well, depending upon scenes to be shot. Namely, the second matrix may include only the parallel translation component, or may include only the rotation component, or may include only the parallel translation component and the rotation component, or may include the enlargement/reduction component, or may include the enlargement/reduction component in addition to the parallel translation component and the rotation component.

Figure 11:
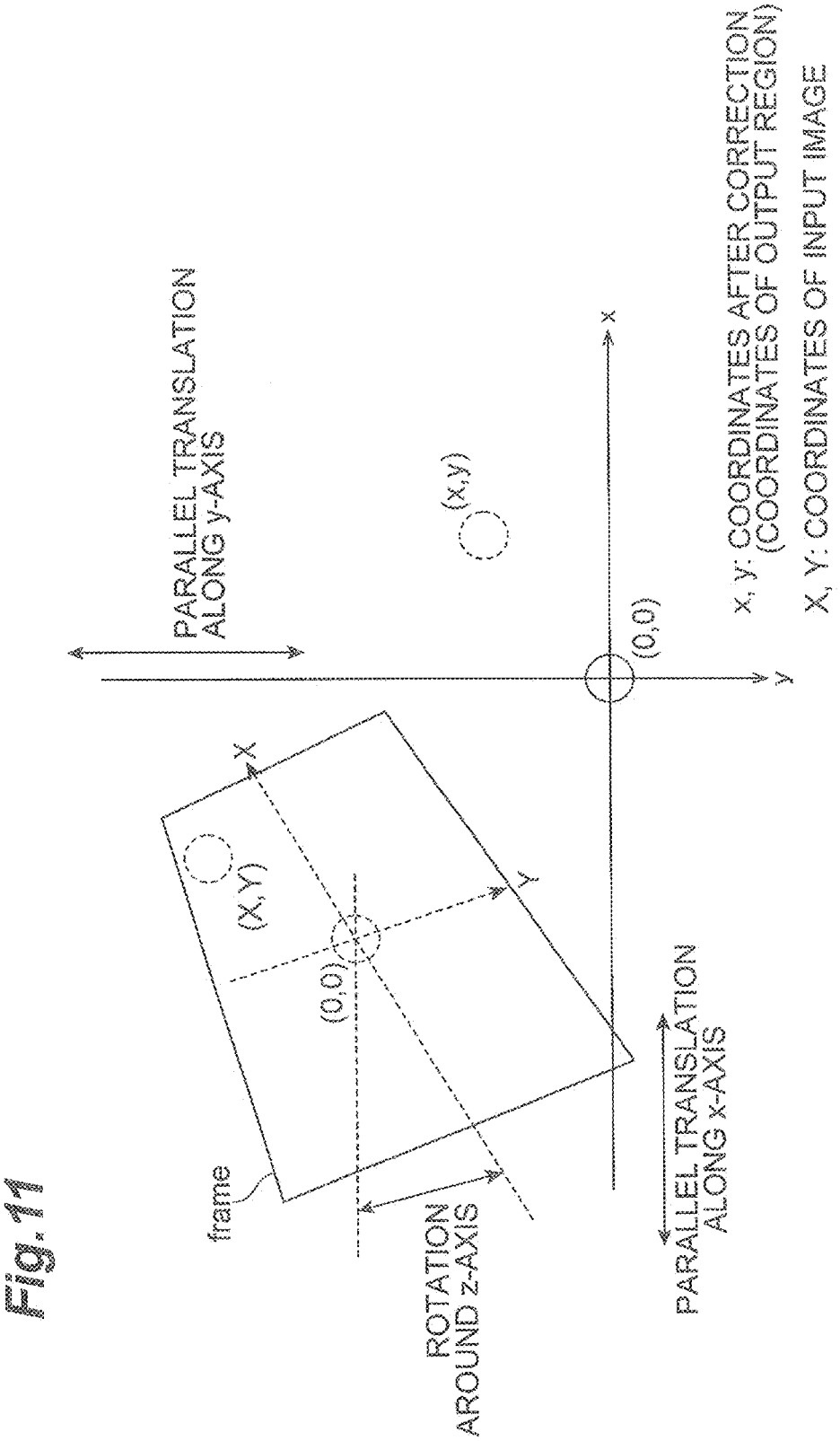
FIG. 11 is a schematic drawing for explaining a parallel translation component and a rotation component.

FIG. 11 is a schematic drawing for explaining the parallel translation component and the rotation component. The motion of the camera 20 is dependent on image-shooting scenes, but most of camera works consist of the parallel translation component and the rotation component. FIG. 11 shows a relation between a coordinate system (x, y) of the output frame image out-frame and a coordinate system (X, Y) of the processing target frame image frame. In FIG. 11, z-axis is defined as an axis extending in the image-shooting direction, and x-axis and y-axis are defined as axes extending in directions perpendicular to the image-shooting direction. When the z-axis is defined as an axis extending in the image-shooting direction and the x-axis and y-axis are defined as axes extending in the directions perpendicular to the image-shooting direction, the parallel translation component is a component of movement in directions parallel to the x-axis, y-axis, and z-axis. The rotation component is at least one rotation component about the x-axis, y-axis, and z-axis and is thus at least one of a yaw component, a roll component, and a pitch component.

The second calculation unit 13 calculates a user motion matrix $A_c$ for calculating the second matrix. The user motion matrix $A_c$ is a matrix used for calculation of the second matrix and includes at least one of the parallel translation component in the directions perpendicular to the image-shooting direction and the rotation component with respect to the image-shooting direction. For example, as shown in FIG. 11, the second calculation unit 13 calculates the user motion matrix $A_c$ to make correspondence between the center coordinates (0, 0) of the output frame image out-frame and the center (0, 0) of the frame image frame as the second frame image. The second calculation unit 13 can calculate the user motion matrix $A_c$ from the motion data P. Specifically, the second calculation unit 13 specifies the center coordinates of the frame image frame, for example, using the known first projection matrix $P_{dst}^{i-1}$ to project the output frame image out-frame to the first frame image, and the motion data P. Then, the second calculation unit 13 effects parallel translation and rotation of the coordinates (x, y) of the output frame image out-frame to calculate the user motion matrix $A_c$ for projection to the center (X, Y) of the frame image frame. The yaw component, roll component, and pitch component can be estimated with some degree of accuracy, for example, from movement amounts near the center and the focal length. Since the motion is restricted to parallel translation and rotation herein, the resulting user motion matrix $A_c$ does not consist of true values but can be obtained as approximately correct values. The second calculation unit 13 outputs the calculated user motion matrix $A_c$ to the auxiliary matrix calculation unit 14.

Figure 12:
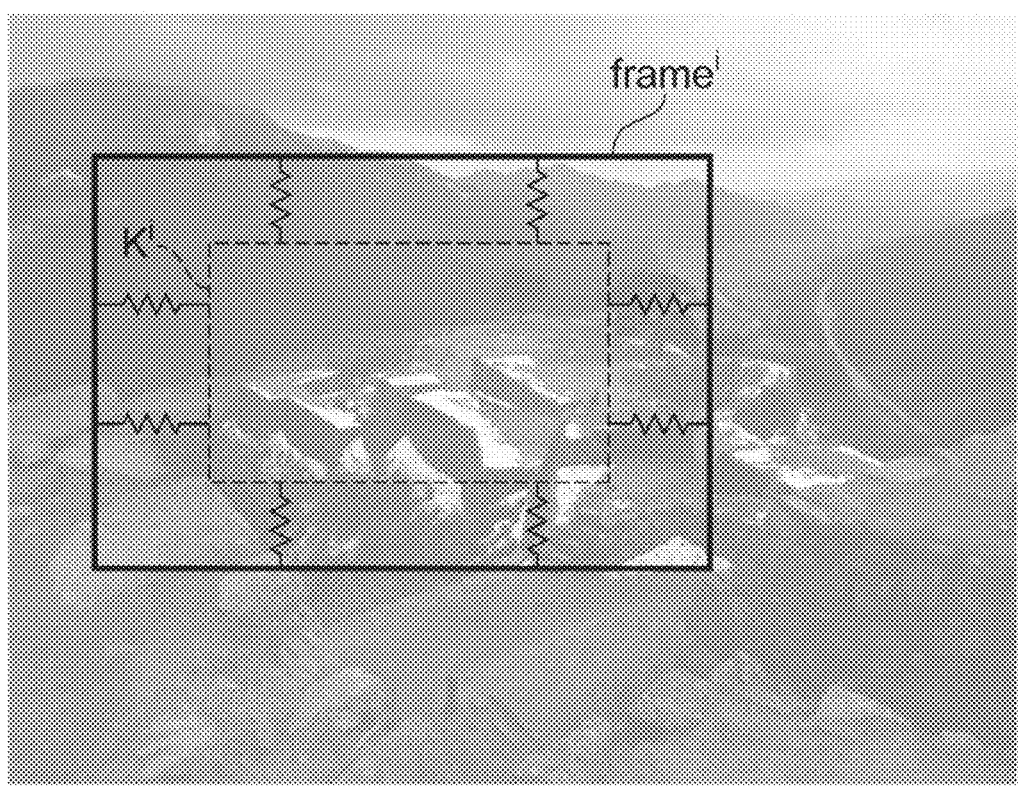
FIG. 12 is a conceptual drawing showing a relation between an input frame image and an output frame image.

The second calculation unit 13 has a function to calculate the second matrix by making a correction for the user motion matrix $A_c$. The second calculation unit 13 has a function to remove the high-frequency components due to the camera shake, as to the motion of the camera 20 that is considered to be intended by the user. The second calculation unit 13 uses a first filter to remove frequency components attributed to a camera work. The first filter is, for example, a high-pass filter. Furthermore, the second calculation unit 13, for example as shown in FIG. 12, may apply a spring model to function so that as the clipping region $K^i$ becomes closer to the outer edge frame of the frame image frame$^i$, it is positioned to be closer to the center position, so as to realize the follow-up to the camera work. For example, the second calculation unit 13 may apply the first filter with an action to position the region closer to the center position in proportion to the square of the distance from the outer edge, to the user motion matrix $A_c$ to obtain the second matrix. The second calculation unit 13 may be configured to adjust the spring constants (proportionality coefficients) in the x-axis, y-axis, and z-axis. The second calculation unit 13 may also be configured to set friction higher near the center of the frame image frame$^i$. This setting allows the device to improve stability of follow-up.

The auxiliary matrix calculation unit 14 calculates a "rest motion matrix $B_c$" of $N \cdot S_{i-i}$, using the user motion matrix $A_c$. Components included in the matrix $B_c$ can include a rest component that is not expressed by the first matrix $D_i$ and the user motion matrix $A_c$, for example, among the eight components shown in FIG. 4, and an error component that is not accurately expressed by the first matrix $D_i$ and the user motion matrix $A_c$ (e.g., an error component of the rolling shutter distortion component, an error component of the rotation component, and so on). Namely, the rest motion matrix $B_c$ varies depending upon the set degrees of freedom and the user motion matrix $A_c$. For example, in a case where the motion is interpreted according to eight degrees of freedom and the user motion matrix $A_c$ includes the enlargement/reduction component, the rest motion matrix $B_c$ includes a component to convert a quadrilateral into a trapezoid ((G) and (H) shown in FIG. 4) and an error component. For example, in a case where the motion is interpreted according to eight degrees of freedom and the user motion matrix $A_c$ does not include the enlargement/reduction component, the rest motion matrix $B_c$ includes the enlargement/reduction component, the component to convert a quadrilateral into a trapezoid ((G) and (H) shown in FIG. 4), and the error component. For example, in a case where the motion is interpreted according to six degrees of freedom and the user motion matrix $A_c$ does not include the enlargement/reduction component, the rest motion matrix $B_c$ includes the enlargement/reduction component and the error component. For example, in a case where the motion is interpreted according to six degrees of freedom and the user motion matrix $A_c$ includes the enlargement/reduction component, the rest motion matrix $B_c$ includes only the error component.

The auxiliary matrix calculation unit 14 calculates the motion matrix $B_c$ including the rest motion component, using $N \cdot S_{i-1}$ calculated using the first projection matrix $S_{i-1}$ and the motion data N in the system with reduced rolling shutter distortion component, and the user motion matrix $A_c$. The below will explain a case where the user motion matrix $A_c$ mainly includes the rotation component (the yaw component $y_i$, the pitch component $p_i$, and the roll component $r_i$). In this case, the auxiliary matrix calculation unit 14 calculates the motion matrix $B_c$ including the rest motion component, using Formula (11) or (12) below.

[Math 14]

$$N \cdot S_{i-1} = y_i \cdot p_i \cdot r_i \cdot l_i \tag{11}$$

$$N \cdot S_{i-1} = l_i \cdot y_i \cdot p_i \cdot r_i \tag{12}$$

Specifically, the auxiliary matrix calculation unit 14 handles the motion component of $N \cdot S_{i-1}$ by dividing it into the user motion matrix $A_c$ including the yaw component $y_i$, the pitch component $p_i$, and the roll component $r_i$, and the rest motion matrix $B_c$ including the other motion component $l_i$, to individually calculate the user motion matrix $A_c$ and substitute the result into above Formula (11) or (12), thereby obtaining the component $l_i$. The below will describe a case where the auxiliary matrix calculation unit 14 uses Formula (11).

The auxiliary matrix calculation unit 14 has a function to correct the calculated "rest motion matrix $B_c$" to obtain the auxiliary matrix. The rest motion matrix $B_c$ is a matrix including the auxiliary component for motion, and can include an error or ignored component. For this reason, the rest motion matrix $B_c$ is ideally an identity matrix to implement identity mapping. Therefore, a question is at what timing the rest motion matrix $B_c$ should be converged to the identity matrix. The second correction unit 16 makes a correction to gradually decrease the error, i.e., a correction to gradually change the rest motion matrix $B_c$ to the identity matrix, instead of a sudden correction to the identity matrix. For example, it may calculate the difference between the identity matrix and the rest motion matrix $B_c$ and effects a correction to make the difference 80%. For example, the auxiliary matrix calculation unit 14 may use a high-pass filter to implement the above processing. When the sudden correction to the identity matrix is avoided in this manner, it becomes feasible to avoid the output frame image having unnatural motion eventually.

The above-described processing of the second calculation unit 13 and the auxiliary matrix calculation unit 14 is summarized as follows.

[Math 15]

$$HPF(N \cdot S_{i-1}) = HPF(y_i) \cdot HPF(p_i) \cdot HPF(r_i) \cdot HPF(l_i)$$

Namely, the second matrix is a matrix resulting from the application of the high-pass filter to the user motion matrix $A_c$ including the yaw component $y_i$, the pitch component $p_i$, and the roll component $r_i$, and the auxiliary matrix is a matrix resulting from the application of the high-pass filter to the rest motion matrix $B_c$. A complicated single-variable filter may be designed only as the high-pass filter to be applied to the yaw component $y_i$, the pitch component $p_i$, and the roll component $r_i$. Namely, an accurate filter is designed only for the motion of the camera 20 reflecting the user's intention. Here, the high-pass filter may be designed, for example, using the data stored in the preceding data storage unit 23. The second calculation unit 13 outputs the calculated second matrix, for example, every calculation of the second matrix to store it in the preceding data storage unit 23. Thereby, the high-pass filter to derive the second matrix is designed, for example, with use of the past second matrix stored in the preceding data storage unit 23. Furthermore, the auxiliary matrix calculation unit 14 applies the high-pass filter to the rest motion components $l_i$. Here, the high-pass filter may be designed, for example, using the data stored in the preceding data storage unit 23. The auxiliary matrix calculation unit 14 outputs the calculated auxiliary matrix, for example, every calculation of the auxiliary matrix to store it in the preceding data storage unit 23. Thereby, the high-pass filter to derive the auxiliary matrix is designed, for example, with use of the past auxiliary matrix stored in the preceding data storage unit 23. It is noted that, as described above, the high-pass filter to be applied to the rest motion component $l_i$ may be so simply designed as to converge it to the identity matrix. Since we can make a distinction between the accurately designed filter and the moderately accurate filter in this manner, the overall filter design becomes easier.

The calculation unit 30 derives the projection matrix $S_i$ in the system without rolling shutter distortion as described below, using the second matrix and the auxiliary matrix.

[Math 16]

$$S_i = HPF(N \cdot S_{i-1}) = HPF(y_i) \cdot HPF(p_i) \cdot HPF(r_i) \cdot HPF(l_i)$$

Then, the calculation unit 30 derives the second projection matrix $P_{dst}{}^i$ to make correspondence between the output frame image out-frame$^i$ and the input frame image frame$^i$, using the first matrix $D_i$, the second matrix, and the auxiliary matrix.

[Math 17]

$$P_{dst}{}^i = D_i \cdot HPF(N \cdot S_{i-1}) = D_i \cdot HPF(y_i) \cdot HPF(p_i) \cdot HPF(r_i) \cdot HPF(l_i) \quad (13)$$

The drawing unit 17 calculates the clipping region $K^i$ of the input frame image frame$^i$, using the second projection matrix $P_{dst}{}^i$ and outputs it as the output frame image out-frame$^{i-1}$ to the display unit 21.

Figure 13:
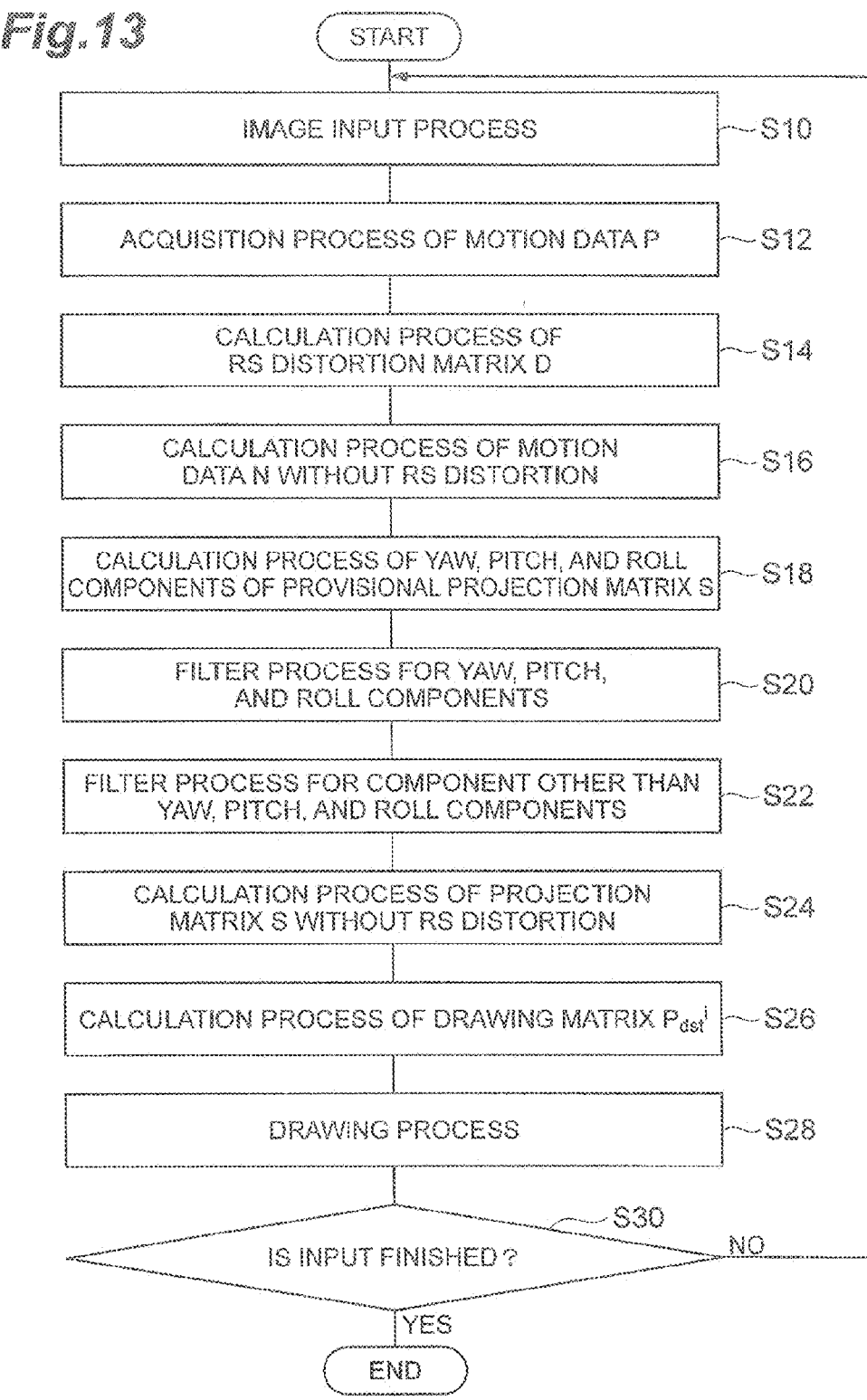
FIG. 13 is a flowchart for explaining the operation of the image processing device according to the embodiment.

The following will describe the operation of the image processing device 1 according to the present embodiment. FIG. 13 is a flowchart showing the operation of the image processing device 1 according to the present embodiment. The control processing shown in FIG. 13 is carried out at the timing when the image-shooting function of the portable terminal 2 is turned on, and is repetitively carried out at predetermined intervals. In view of easiness of understanding of description, the input frame image as a processing target is assumed to be the second or subsequent input frame image.

As shown in FIG. 13, the image processing device 1 first executes an image input process (S10: input step). In the process of S10, the input unit 10 implements input of the input frame image frame$^i$ from the camera 20. After completion of the process of S10, the operation shifts to a motion data acquisition process (S12: motion acquisition step).

In the process of S12, the motion acquisition unit 11 acquires the motion data P between the input frame image frame$^i$ and the frame image frame$^{i-1}$. After completion of the process of S12, the operation shifts to a process of calculating the first matrix $D_i$ including the rolling shutter distortion component (S14: first calculation step).

In the process of S14, the first calculation unit 12 calculates the first matrix $D_i$ including the rolling shutter distortion component, based on the motion data acquired in the process of S12. After completion of the process of S14, the operation shifts to a process of calculating the motion data N (S16).

In the process of S16, the calculation unit 30 calculates the provisional motion data N, using the motion data P acquired in the process of S12 and the first matrix $D_i$ acquired in the process of S14. After completion of the process of S16, the operation shifts to a rotation component calculation process (S18).

In the process of S18, the second calculation unit 13 calculates the rotation component (user motion matrix $A_c$). The rotation component can be estimated with some degree of accuracy, for example, from the movement amount of the center position of the input frame image frame$^i$ and the focal length. Calculation in the yaw direction will be explained as an example. When the movement amount in the x-axis direction is denoted by $d_{mx}$ and the focal length by $d_n$, the component in the yaw direction can be simply calculated by the following formula.

[Math 18]

$$yaw = \arctan\left(\frac{d_{mx}}{d_n}\right)$$

After completion of the process of S18, the operation shifts to a process of filtering the user motion matrix $A_c$ (S20: second calculation step).

In the process of S20, the second calculation unit 13 corrects the the user motion matrix $A_c$ acquired in the process of S18, with the high-pass filter to obtain the second matrix. Specifically, the second calculation unit 13 refers to the preceding data storage unit 23 to acquire the second matrix in the past, and obtains the second matrix, using the past second matrix and the motion matrix $A_c$. After completion of the process of S20, the operation shifts to a process of filtering the rest motion matrix $B_c$ (S22: auxiliary matrix calculation step).

In the process of S22, the auxiliary matrix calculation unit 14 calculates the rest motion matrix $B_c$ and subjects the rest motion matrix $B_c$ to the filter process, thereby obtaining the auxiliary matrix $B_c$. First, the auxiliary matrix calculation unit 14 handles the motion component of $N \cdot S_{i-1}$ by dividing it into the user motion matrix $A_c$ including the yaw component $y_i$, the pitch component $p_i$, and the roll component $r_i$, and the rest motion matrix $r_i$ including the other motion component $l_i$, individually calculates the user motion matrix $A_c$ and substitutes the result into the aforementioned Formula (11), thereby obtaining the component $l_i$ as the rest motion matrix $B_c$. The auxiliary matrix calculation unit 14 may be configured to refer to the preceding data storage unit 23 to acquire the auxiliary matrix in the past, and obtains the auxiliary matrix, using the past auxiliary matrix and the motion matrix $A_c$.

In the process of S24, the calculation unit 30 calculates the projection matrix $S_i$ in the system without rolling shutter distortion, using the second matrix acquired in the process of S20 and the auxiliary matrix acquired in the process of S22. After completion of the process of S24, the operation shifts to a process of calculating the drawing matrix (projection matrix) (S26).

In the process of S26, the calculation unit 30 calculates the second projection matrix $P_{dst}^{i}$ in the input image system, using the projection matrix $S_i$ obtained in the process of S24, for example, as shown by the aforementioned Formula (4). After completion of the process of S26, the operation shifts to a drawing process (S28: drawing step).

In the process of S28, the drawing unit 17 calculates the clipping region $K^i$ of the input frame image frame$^i$ with the use of the second projection matrix $P_{dst}^{i}$ acquired in the process of S26, and outputs the result as the output frame image out-frame$^i$ to the display unit 21. After completion of the process of S28, the operation shifts to a determination process (S30).

In the process of S30, the image processing device 1 determines whether input of an image is finished. The image processing device 1 determines whether input of an image is finished, for example, based on whether the number of inputs reaches a predetermined input count, or, based on whether a predetermined time has elapsed since the preceding input. When it is determined in the process of S30 that input of an image is not finished, the operation shifts again to the process of S10. On the other hand, when it is determined in the process of S30 that input of an image is finished, the control processing shown in FIG. 13 is terminated. By executing the control processing shown in FIG. 13, it becomes feasible to independently correct the parallel translation component and the rotation component strongly reflecting the human intention, and the other component and error component, without relation to each other. It is noted herein that the first calculation step, the second calculation step, and the auxiliary matrix calculation step correspond to a matrix operation step.

The below will describe an image processing program for letting the portable terminal (computer) 2 function as the image processing device 1.

The image processing program has a main module, an input module, and an operation processing module. The main module is a part that generally controls the image processing. The input module makes the portable terminal 2 operate so as to acquire an input image. The operation processing module has a motion acquisition module, a calculation module (first calculation module, second calculation module, and auxiliary matrix calculation module), and a drawing module. Functions realized by executing the mail module, input module, and operation processing module are the same as the functions of the input unit 10, motion acquisition unit 11, calculation unit 30 (first calculation unit 12, second calculation unit 13, and auxiliary matrix calculation unit 14), and drawing unit 17, respectively, of the aforementioned image processing device 1.

The image processing program is provided, for example, by a storage medium such as ROM, or by a semiconductor memory. Furthermore, the image processing program may be provided as a data signal through a network.

As described above, the image processing device 1, image processing method, and image processing program according to the present embodiment are configured to handle the motion of deformation of the image by separating it into at least either the parallel translation component or the rotation component, the rolling shutter distortion component, and the other component, and individually calculate each of them. The first calculation unit 12 calculates with some accuracy the first matrix $D_i$ including the rolling shutter distortion component, using the motion data. The second calculation unit 13 calculates with some accuracy the user motion matrix $A_c$ including at least one of the parallel translation component in the directions perpendicular to the image-shooting direction and the rotation component with respect to the image-shooting direction, using the known first projection matrix $P_{dst}^{i-1}$ to project the output frame image out-frame$^{i-1}$ to the reference frame image frame$^{i-1}$, and the motion data P. The auxiliary matrix calculation unit 14 calculates the rest motion matrix $B_c$ not including the motion component included in the first matrix $D_i$ and the user motion matrix $A_c$, using the first matrix $D_i$, the user motion matrix $A_c$, and the first projection matrix $P_{dst}^{i-1}$. Then, the user motion matrix $A_c$ and the rest motion matrix $B_c$ are corrected to calculate the second matrix and the auxiliary matrix. In this manner, the image processing device 1 can decompose the motion data into three parts and individually calculate them in the calculation procedure, which makes the processing according to the motion component possible. For example, it becomes possible to exclude the rolling shutter distortion component to be removed, from the correction target to be subjected to removal of the camera shake or the like. This can facilitate design of computation cost for correction and correction filters. Furthermore, since the parallel translation component or the rotation component, and the component in the auxiliary matrix are calculated by the respective different formulas, it becomes feasible to independently correct the parallel translation component or the rotation component strongly reflecting the human intention, and the other remaining component without relation to each other. Namely, since the motion component strongly reflecting the human intention and the other motion component can be corrected by the different filters, it becomes feasible to simultaneously achieve elimination of the defect due to the motion not intended by the user, and appropriate follow-up to a camera work. Since the corrections for the respective components are independent, the correction filters can be readily designed. In addition, even if the format of motion data is changed or there is inaccurate data, it is possible to make the auxiliary matrix include a changed portion of the format of motion data or an error portion and thus the foregoing processing can be compatible with all formats of motion data. Since there are no restrictions on the calculation method of motion by the second calculation unit, a calculation method that is not accurate but robust can be applied to the calculation method of motion by the second calculation unit. In this case, robust processing can be carried out as a whole of the image processing device 1. Furthermore, it becomes feasible to implement perfect electronic camera-shake correction.

Furthermore, the image processing device 1, image processing method, and image processing program according to the present embodiment can make the correction to ideal values (or identity mapping), while taking advantage of the values of the rest motion matrix $B_c$. For this reason, it becomes feasible to more naturally eliminate the defect due to the motion not intended by the user.

In addition, the image processing device 1, image processing method, and image processing program according to the present embodiment are configured to assume that the rolling shutter distortion component is attributed to the parallel translation component only, the rolling shutter distortion component can be readily and quickly estimated as a relatively accurate component.

The above-described embodiment shows an example of the image processing device according to the present invention. The image processing device according to the present invention is not limited only to the image processing device 1 according to the embodiment, but may be one obtained by modifying the image processing device according to the embodiment or by applying it to other devices, without departing from the spirit and scope of the invention described in each of the claims.

For example, the foregoing embodiment described the example wherein the camera 20 generates videos, but the camera 20 may be one that continuously generates still images. Images implemented by the input unit 10 may be images transmitted through a network from another device.

The above embodiment was described on the assumption that the images generated by the camera 20 had the same size, but the size of the generated image may be different every time of generating of an image.

The above embodiment described the case where the image was deformed according to the eight degrees of freedom shown in FIG. 4, but the degrees of freedom do not have to be limited to the eight degrees but may be, for example, the six degrees of freedom shown in (A) to (F) in FIG. 4.

The above embodiment described the example where the first calculation unit 12 estimated the rolling shutter distortion component and the example where the second calculation unit 13 estimated the parallel translation component and the rotation component, but, without having to be limited to the above techniques, it is possible to adopt various known methods. Furthermore, the first calculation unit 12 may be configured to estimate the rolling shutter distortion component, using the parallel translation component acquired by the second calculation unit 13.

The sequence of the flowchart described in the above embodiment can be modified as occasion may demand. For example, the process of S18 or the sequential processes of S18 and S20 may be carried out in parallel with the process of S14 or S16.

The above embodiment showed the case where the projection matrix to associate the second frame image with the output frame image was calculated with the use of the first frame image and the second frame image, but the present invention does not have to be limited to it. Namely, the output frame image does not have to be successively generated with the input frame image, and there may be a time difference between the input frame image and a reference frame image for the output frame image. For example, a third frame image existing between the first frame image and the second frame image may be used as a processing target for generating the output frame image, to calculate the projection matrix to associate the third frame image with the output frame image. The third frame image may be processed in the same manner as the second frame image as described in the above embodiment, or the projection matrix to the third frame image may be calculated using not only the first frame image but also the second frame image. Namely, the projection matrix to the third frame image may be calculated using the first frame image which is past data with respect to the third frame image and the second frame image which is future data with respect to the third frame image.

Furthermore, the above embodiment described the example wherein the high-pass filter was made to act on the motion data P and the first projection matrix $P_{dst}^{i-1}$, for example, as shown by Formula (2), but the target of action of the high-pass filter may be modified as occasion may demand. For example, Formula (2) may be modified as follows.

[Math 19]

$$P_{dst}^{i}=HPF(P) \cdot P_{dst}^{i-1}$$

In this case, the high-pass filter acts on the motion data N. In this case, Formula (13) is modified as follows.

[Math 20]

$$P_{dst}^{i}=D_i \cdot HPF(N) \cdot S_{i-1}=D_i \cdot HPF(y_i) \cdot HPF(p_i) \cdot HPF(r_i) \cdot HPF(l_i) \cdot S_{i-1}$$

As in this formula, the motion data N may be one in a divided form. Furthermore, the high-pass filter may be one that changes the coefficient of the high-pass filter, depending upon the clipping position.

REFERENCE SIGNS LIST 1 image processing device; 10 input unit; 11 motion acquisition unit; 12 first calculation unit; 13 second calculation unit; 14 auxiliary matrix calculation unit; 17 drawing unit; 20 camera; 21 display unit; 22 image storage unit; 30 calculation unit (matrix operation unit).

The invention claimed is:

1. An image processing device which sets in a frame image generated by an imaging device, a region of a size smaller than the frame image, and which corrects a position or a shape of the region according to motion of the imaging device to generate an output frame image, the image processing device comprising:
   a processor; and
   memory storing executable instructions that, when executed by the processor, causes the processor to perform as:
      an input unit that implements sequential input of a first frame image and a second frame image;

a motion acquisition unit that acquires motion data between the first frame image and the second frame image;

a matrix operation unit that calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix; and a drawing unit that generates the output frame image from the second frame image by using the projection matrix, wherein the processor further causes the matrix operation unit to perform as:

a first calculation unit that calculates the first matrix for the projection matrix by calculating the rolling shutter distortion component using a parallel translation component included in the motion data;

a second calculation unit that calculates, for each of the second frame image and frame images subsequent to the second frame image, the second matrix for the projection matrix by using the motion data, the first matrix, and a past version of the second matrix derived at a preceding operation; and an auxiliary matrix calculation unit that, for each of the second frame image and frame images subsequent to the second frame image, calculates the auxiliary matrix for the projection matrix by using the motion data, the first matrix, and a past auxiliary matrix derived at a preceding operation.

2. The image processing device according to claim 1, wherein the auxiliary matrix includes a component to convert a rectangle to a trapezoid.

3. The image processing device according to claim 2, wherein the auxiliary matrix includes an enlargement/reduction component.

4. The image processing device according to claim 2, wherein the second matrix includes an enlargement/reduction component.

5. The image processing device according to claim 2, wherein the motion acquisition unit acquires an output value from a gyro sensor.

6. The image processing device according to claim 1, wherein the auxiliary matrix includes an enlargement/reduction component.

7. The image processing device according to claim 6, wherein the second matrix includes an enlargement/reduction component.

8. The image processing device according to claim 6, wherein the motion acquisition unit acquires an output value from a gyro sensor.

9. The image processing device according to claim 1, wherein the second matrix includes an enlargement/reduction component.

10. The image processing device according to claim 9, wherein the motion acquisition unit acquires an output value from a gyro sensor.

11. The image processing device according to claim 1, wherein the motion acquisition unit acquires an output value from a gyro sensor.

12. The image processing device according to claim 1, wherein the motion acquisition unit acquires an output value from a gyro sensor.

13. An image processing method which sets in a frame image generated by an imaging device, a region of a size smaller than the frame image, and which corrects a position or a shape of the region according to motion of the imaging device to generate an output frame image, the image processing method comprising causing a processor to perform:

implementing sequential input of a first frame image and a second frame image;

acquiring motion data between the first frame image and the second frame image;

calculating a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix; and generating the output frame image from the second frame image by using the projection matrix, wherein calculating a projection matrix comprises:

calculating the first matrix for the projection matrix by calculating the rolling shutter distortion component using a parallel transition component included in the motion data;

calculating the second matrix for the projection matrix, for each of the second frame image and frame images subsequent to the second frame image, by using the motion data, the first matrix, and a past version of the second matrix derived at a preceding operation; and calculating the auxiliary matrix for the projection matrix, for each of the second frame image and frame images subsequent to the second frame image, by using the motion data, the first matrix, and a past auxiliary matrix derived at a preceding operation.

14. A non-transitory computer-readable storage medium storing an image processing program which lets a computer function to set in a frame image generated by an imaging device, a region of a size smaller than the frame image, and to correct a position or a shape of the region according to motion of the imaging device to generate an output frame image, the image processing program letting a processor in the computer perform as:

an input unit that implements sequential input of a first frame image and a second frame image;

a motion acquisition unit that acquires motion data between the first frame image and the second frame image;

a matrix operation unit that calculates a projection matrix to project the output frame image to the second frame image, from a first matrix including a rolling shutter distortion component, a second matrix including at least one of a parallel translation component in directions perpendicular to an image-shooting direction and a rotation component with respect to the image-shooting direction, and an auxiliary matrix including a motion component not included in the first matrix and the second matrix; and a drawing unit that generates the output frame image from the second frame image by using the projection matrix, wherein he processor, further causes the matrix operation unit to perform as:

a first calculation unit that calculates the first matrix for the projection matrix by calculating the rolling shutter distortion component using a parallel translation component included in the motion data;

a second calculation unit that calculates, for each of the second frame image and frame images subsequent to the second frame image, the second matrix for the projection matrix by using the motion data, the first matrix, and a past version of the second matrix derived at a preceding operation; and an auxiliary matrix calculation unit that calculates, for each of the second frame image and frame images subsequent to the second frame image, the auxiliary matrix for the projection matrix by using the motion data, the first matrix, and a past version of the auxiliary matrix derived at a preceding operation.

* * * * *